(12) United States Patent
Cha et al.

(10) Patent No.: US 10,344,626 B2
(45) Date of Patent: Jul. 9, 2019

(54) HYBRID POWER GENERATION SYSTEM

(71) Applicant: DOOSAN HEAVY INDUSTRIES & CONSTRUCTION CO., LTD., Gyeongsangnam-do (KR)

(72) Inventors: Song Hun Cha, Gyeonggi-do (KR); Hak Soo Kim, Gyeonggi-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 15/722,995

(22) Filed: Oct. 2, 2017

(65) Prior Publication Data

US 2018/0094547 A1    Apr. 5, 2018

(30) Foreign Application Priority Data

Oct. 4, 2016 (KR) .................. 10-2016-0127568

(51) Int. Cl.
| | |
|---|---|
| *F01K 7/32* | (2006.01) |
| *F01K 23/04* | (2006.01) |
| *F01K 11/02* | (2006.01) |
| *F01K 25/10* | (2006.01) |
| *F01K 23/02* | (2006.01) |

(52) U.S. Cl.
CPC .............. *F01K 7/32* (2013.01); *F01K 11/02* (2013.01); *F01K 23/02* (2013.01); *F01K 23/04* (2013.01); *F01K 25/103* (2013.01); *Y02E 20/14* (2013.01); *Y02P 80/15* (2015.11)

(58) Field of Classification Search
CPC .......... F01K 7/32; F01K 23/04; F01K 25/103; F01K 11/02; F01K 23/02; Y02E 20/14; Y02P 80/15
USPC ................... 60/655, 651, 671, 653, 677–680
See application file for complete search history.

(56) References Cited

U.S. PATENT DOCUMENTS

| | | | | |
|---|---|---|---|---|
| 3,971,211 A | * | 7/1976 | Wethe | F01K 7/32 60/39.181 |
| 8,613,195 B2 | * | 12/2013 | Held | F01K 3/185 60/645 |
| 8,857,186 B2 | * | 10/2014 | Held | F01K 25/08 60/655 |
| 8,904,791 B2 | * | 12/2014 | Lehar | F01K 23/02 60/655 |

FOREIGN PATENT DOCUMENTS

| | | |
|---|---|---|
| CN | 103244214 A | 8/2013 |
| KR | 20140064704 A | 5/2014 |
| KR | 20150036155 A | 4/2015 |
| KR | 101536760 B1 | 7/2015 |
| KR | 101628030 B1 | 6/2016 |

* cited by examiner

*Primary Examiner* — Hoang M Nguyen
(74) *Attorney, Agent, or Firm* — Invenstone Patent, LLC

(57) ABSTRACT

Disclosed herein is a hybrid power generation system. The hybrid power generation system may enhance efficiency of production of electricity and heating heat by integrating power generation using supercritical carbon dioxide ($CO_2$) and cogeneration.

19 Claims, 30 Drawing Sheets

[Fig. 1]
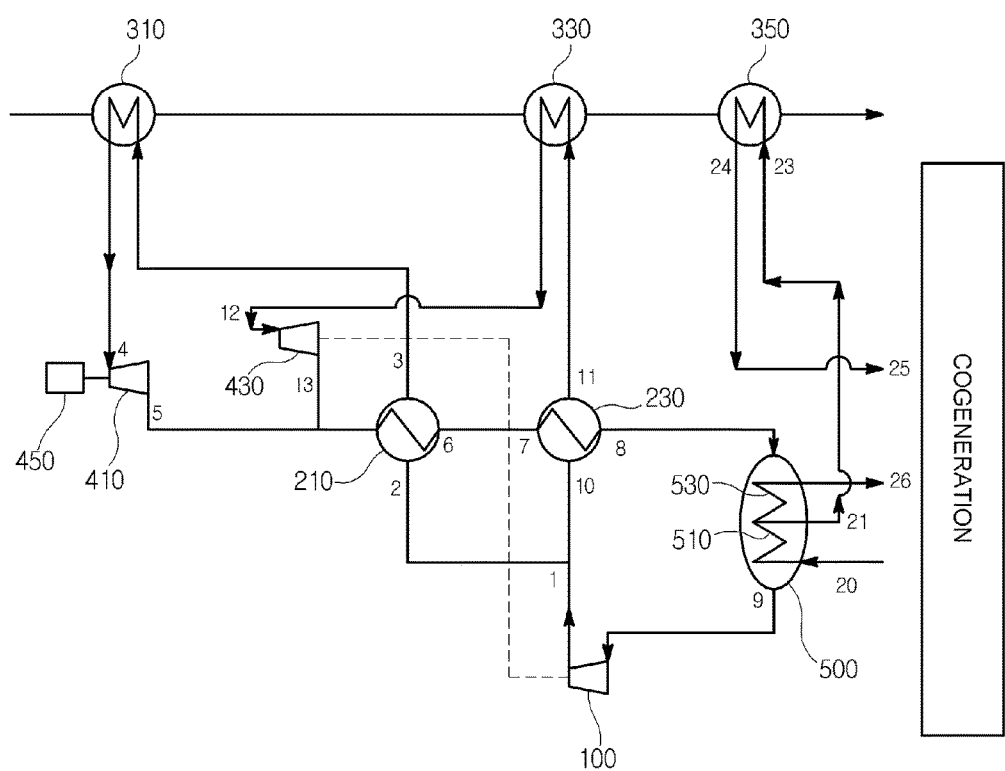

[Fig. 2]
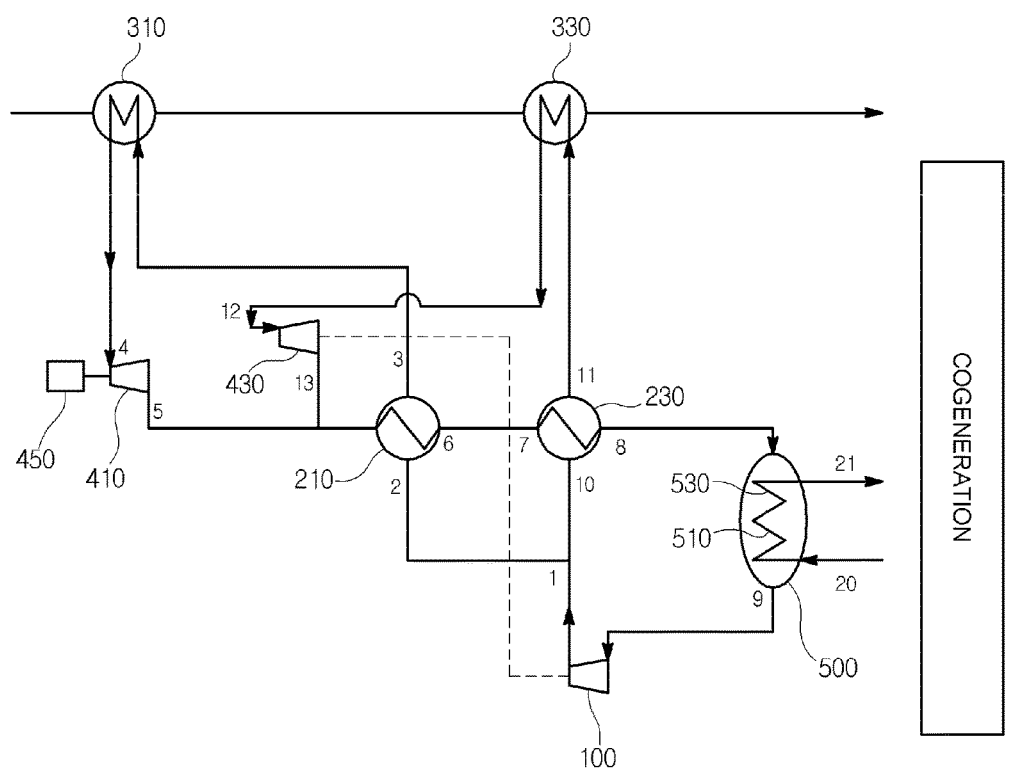

[Fig. 3]
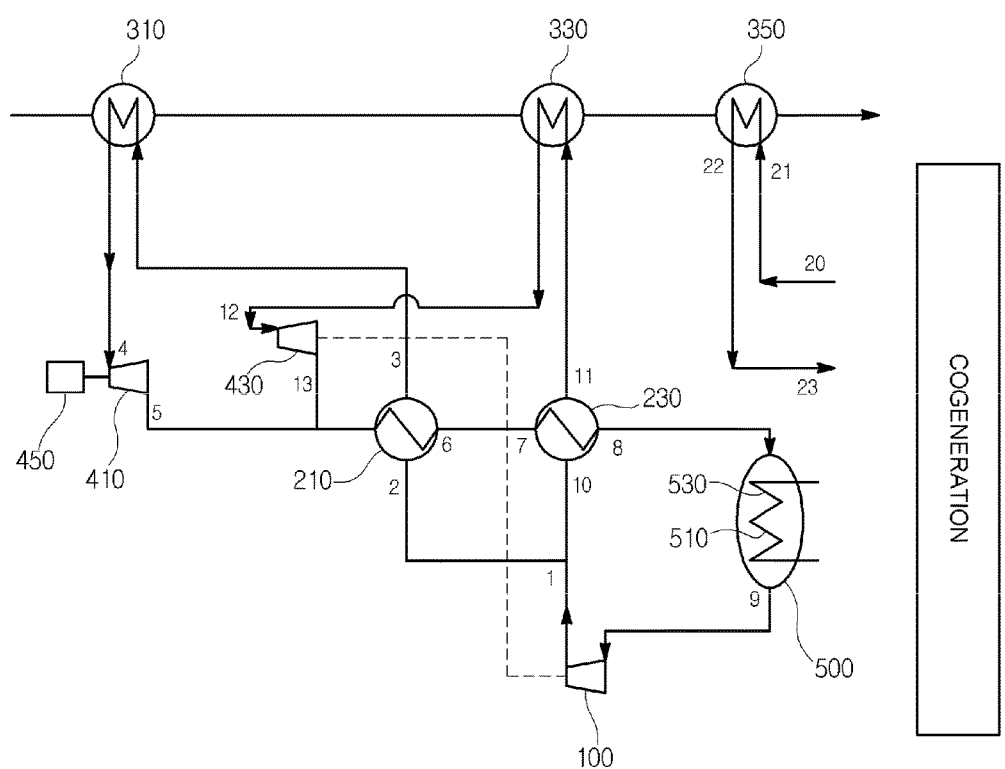

[Fig. 4]
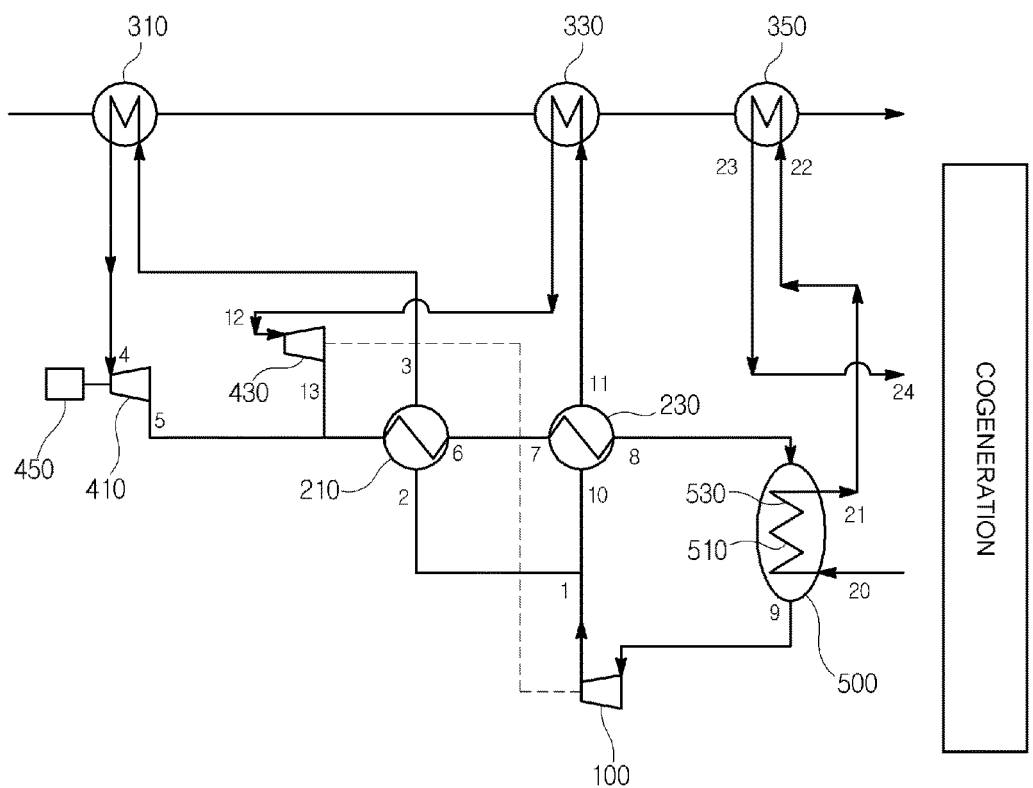

[Fig. 5]
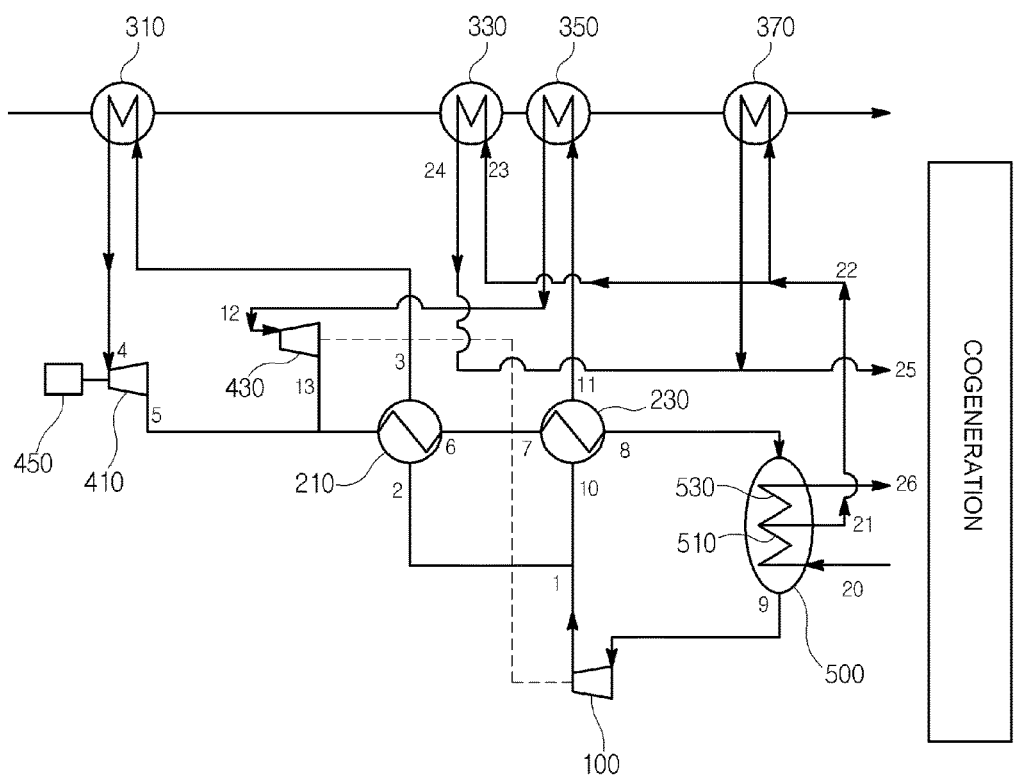

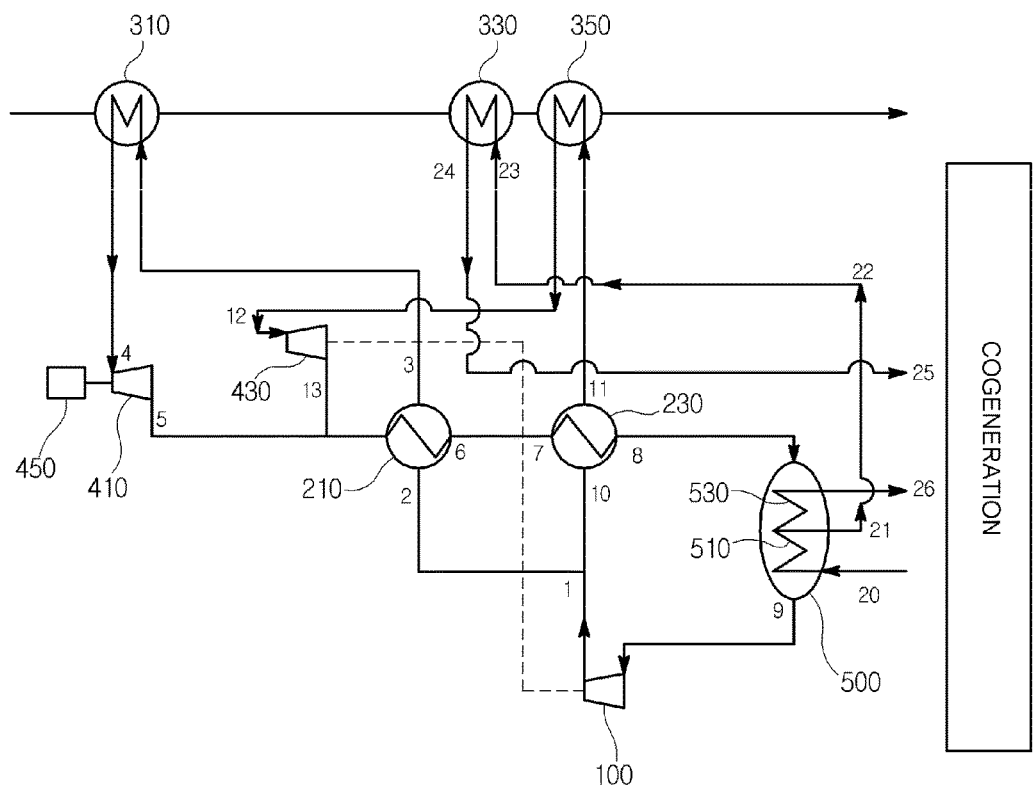
[Fig. 6]

[Fig. 7]
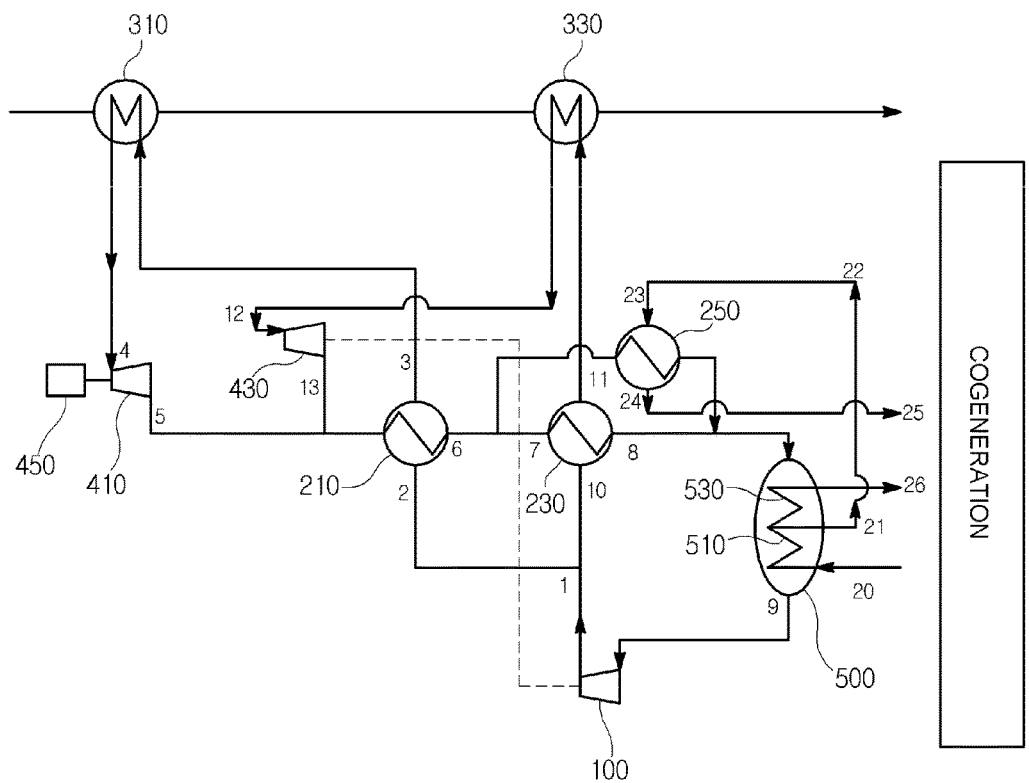

[Fig. 8]
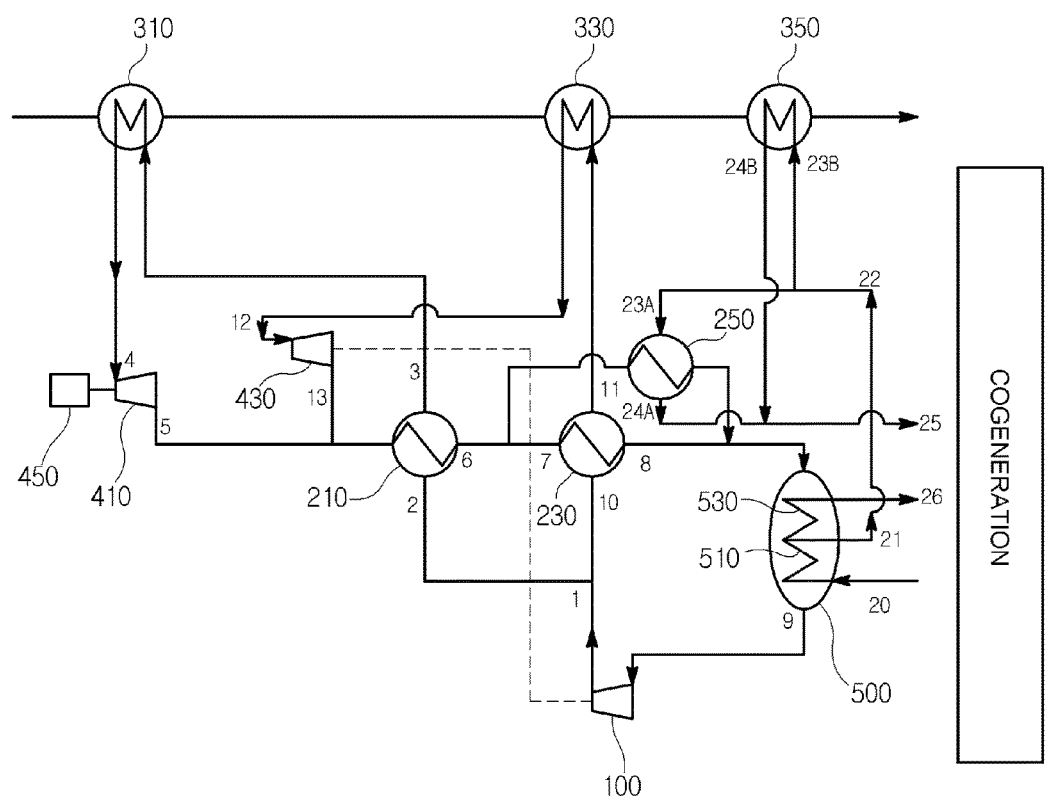

[Fig. 9]
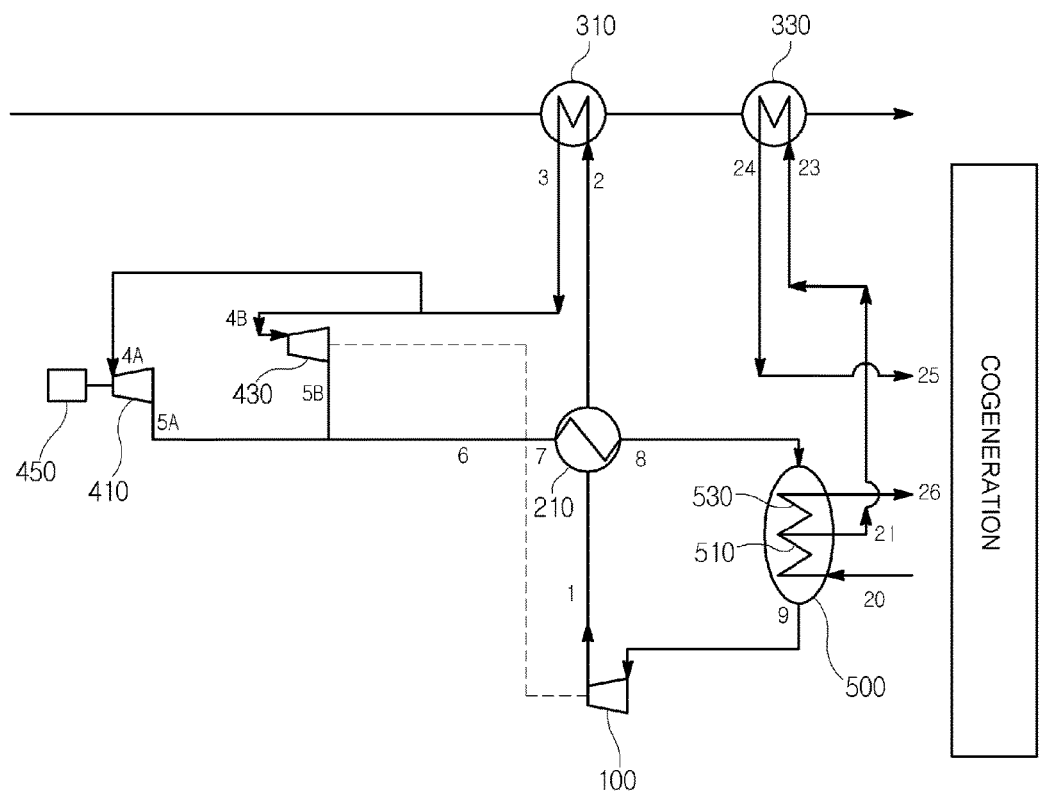

[Fig. 10]
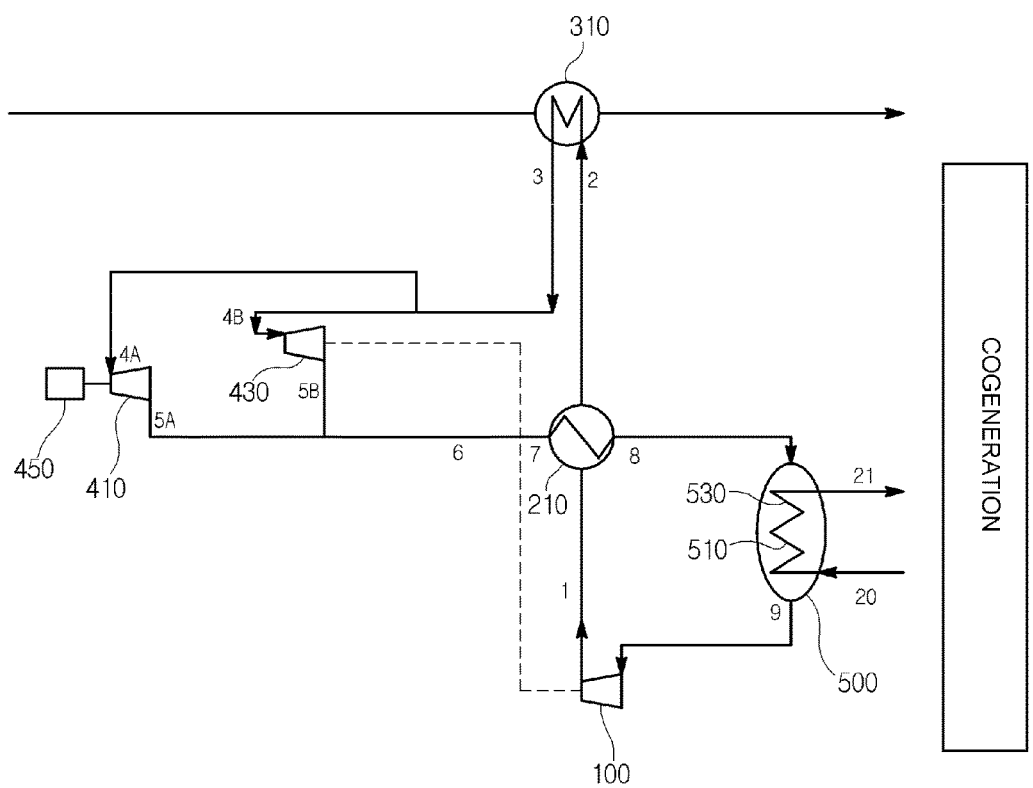

[Fig. 11]
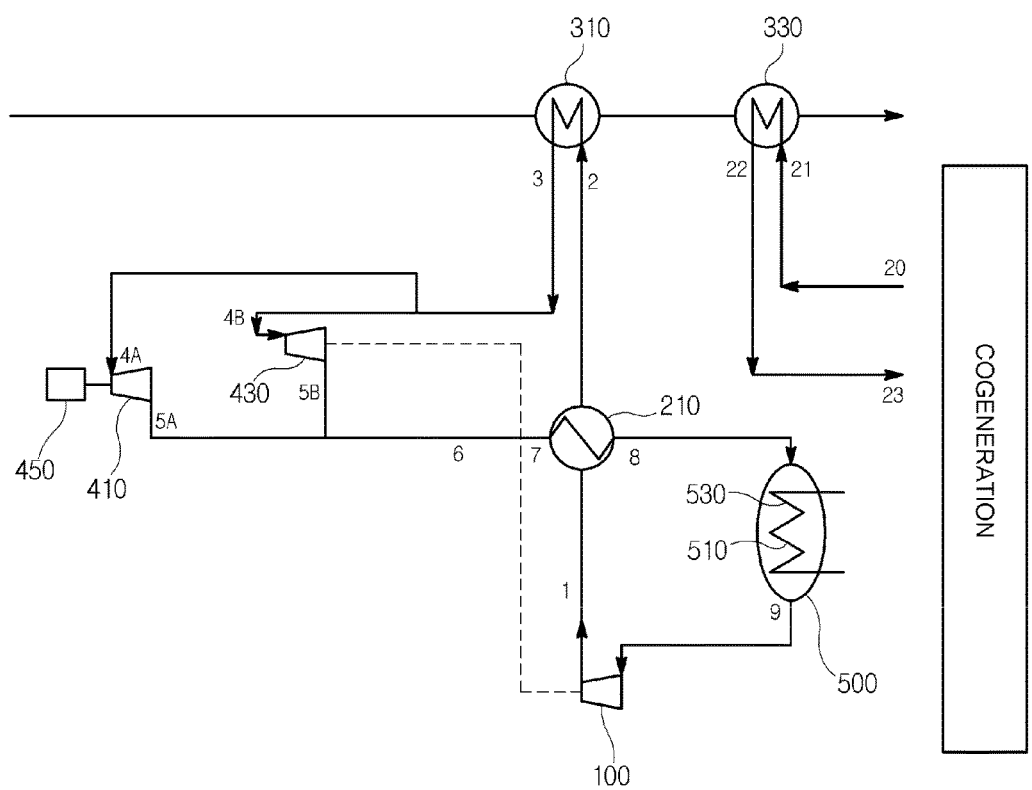

[Fig. 12]
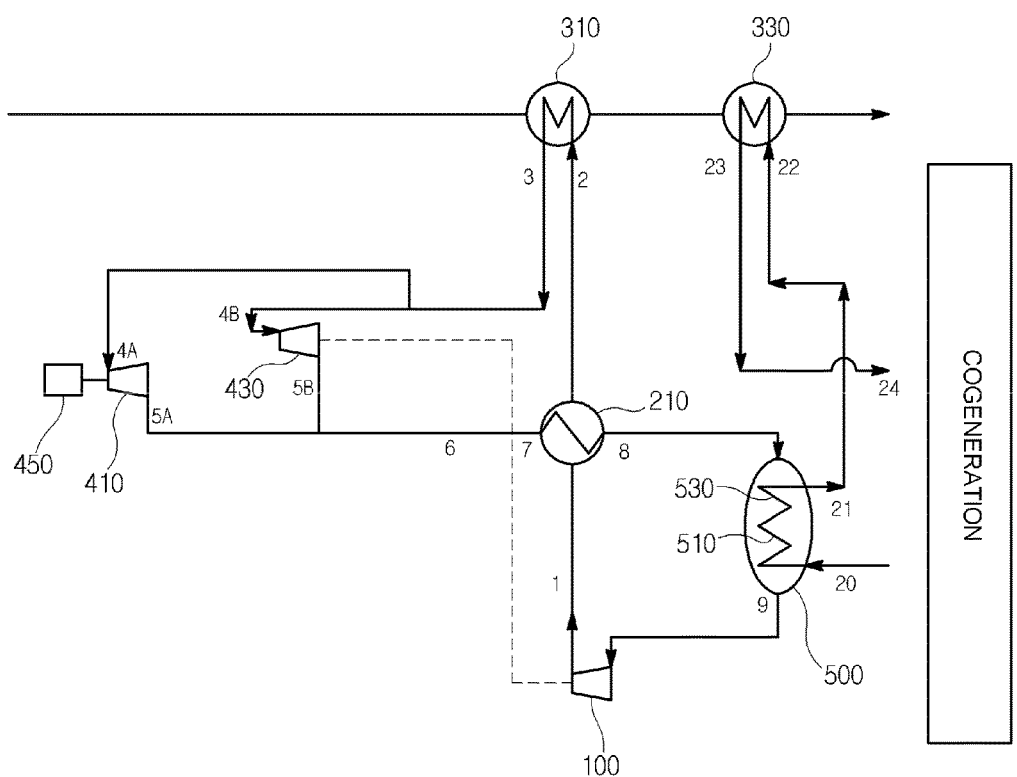

[Fig. 13]
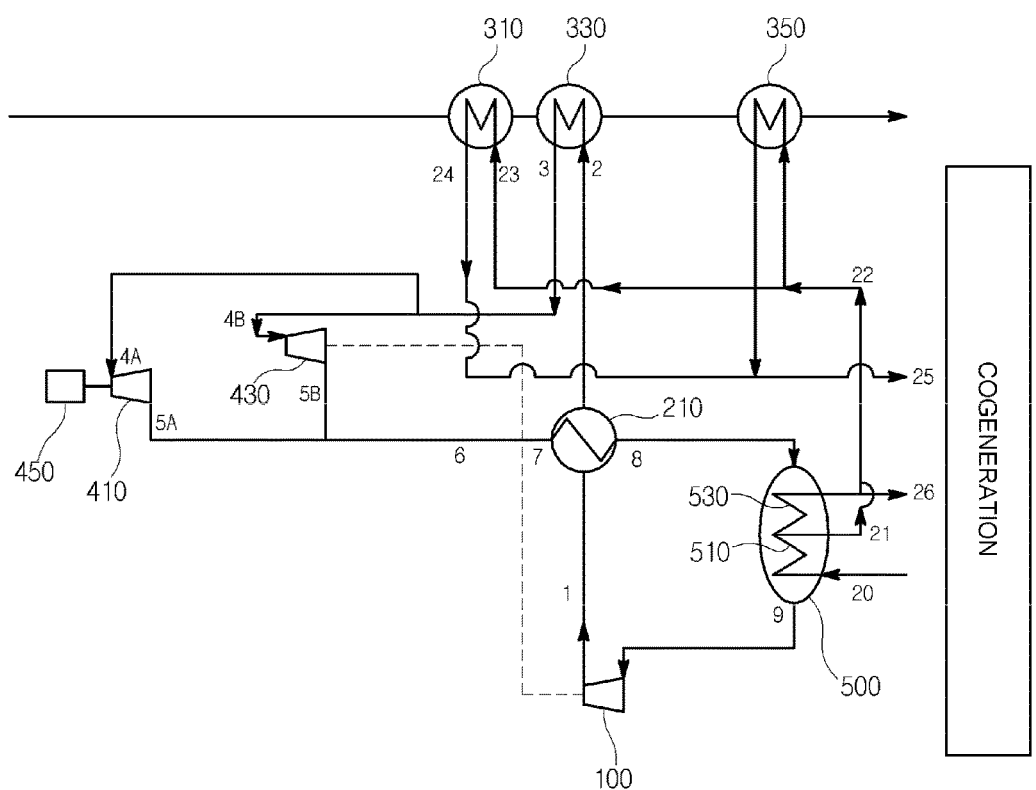

[Fig. 14]
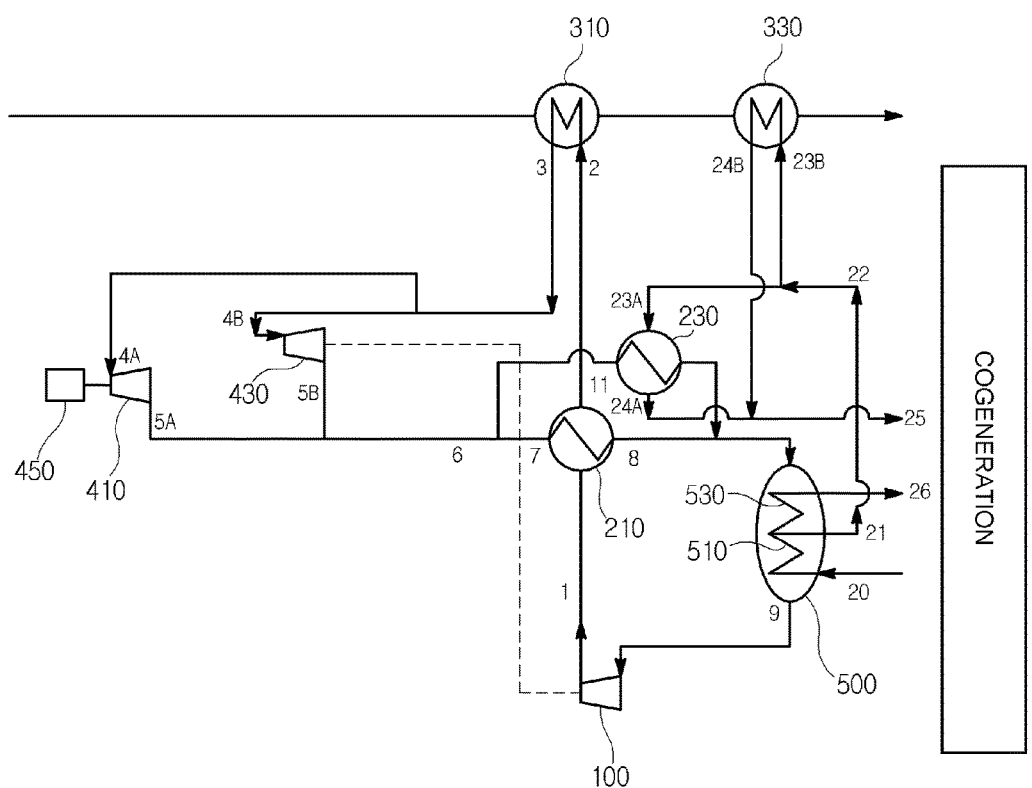

[Fig. 15]
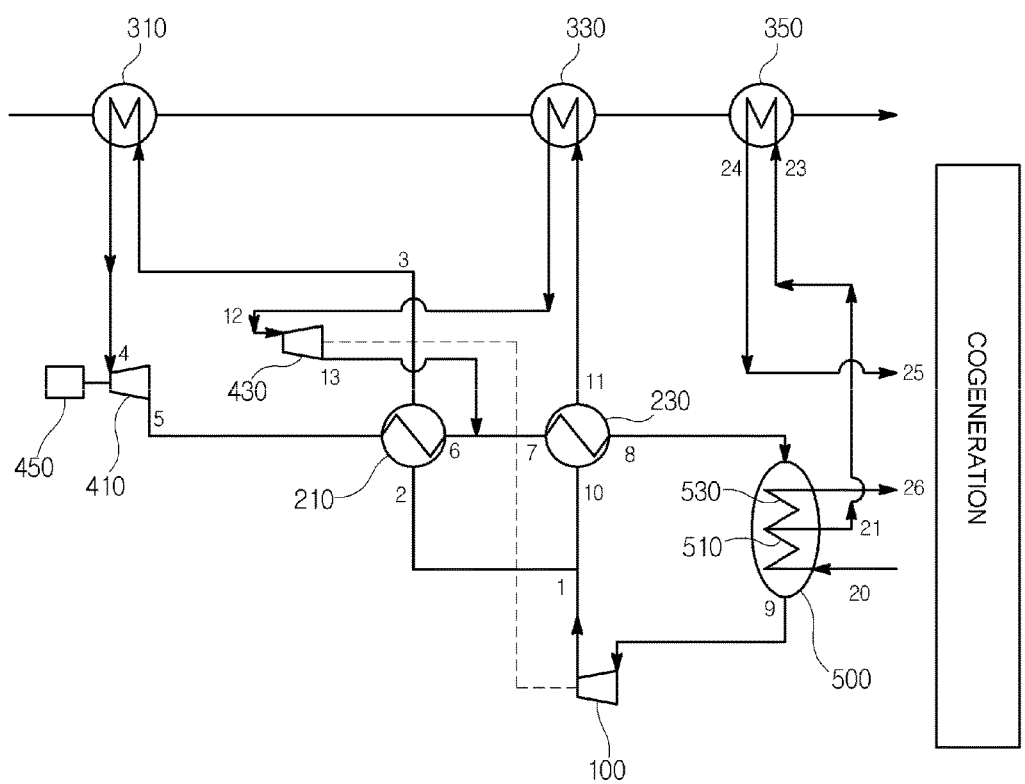

[Fig. 16]
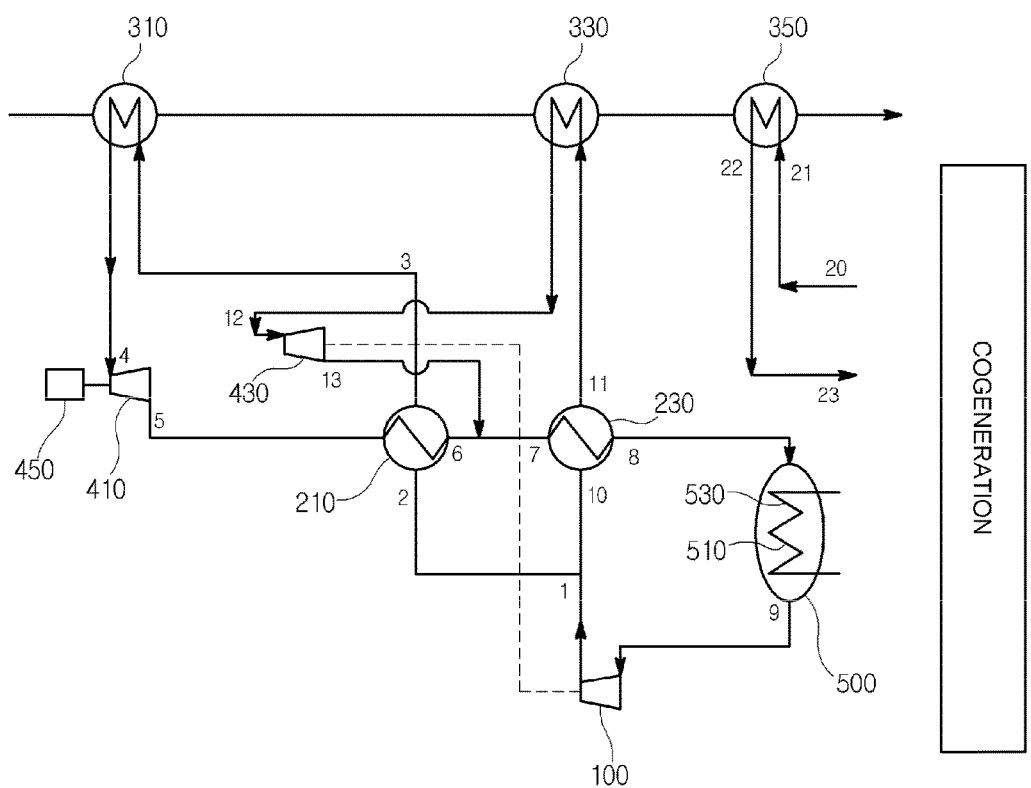

[Fig. 17]
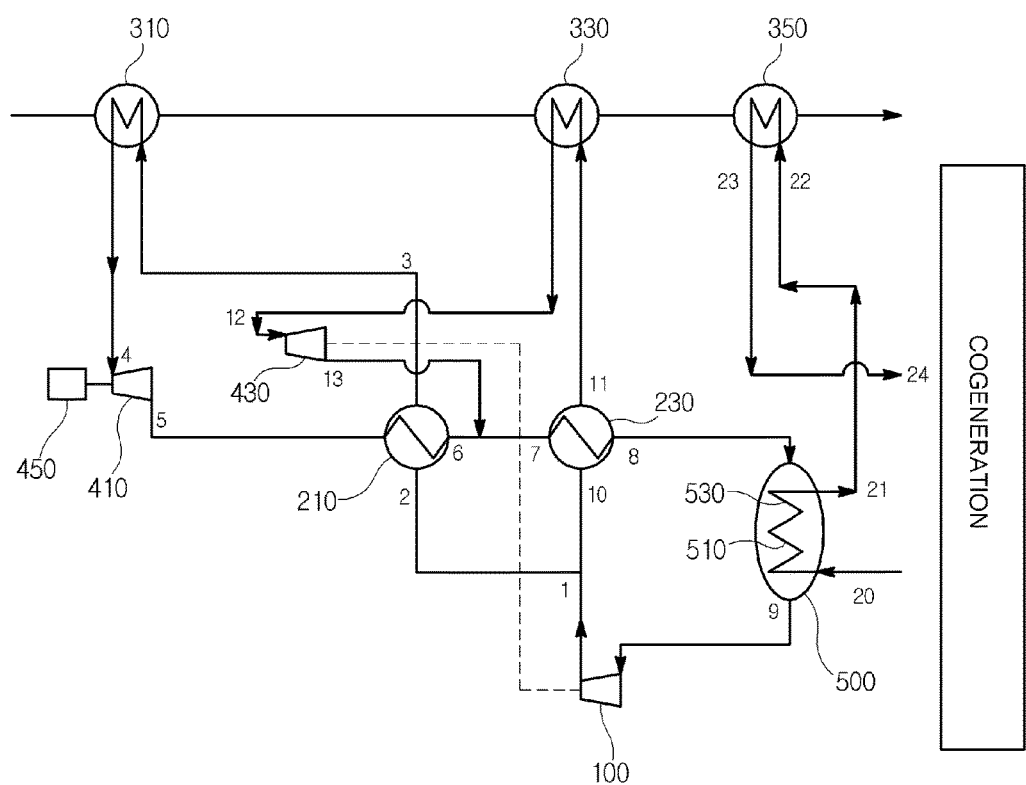

[Fig. 18]
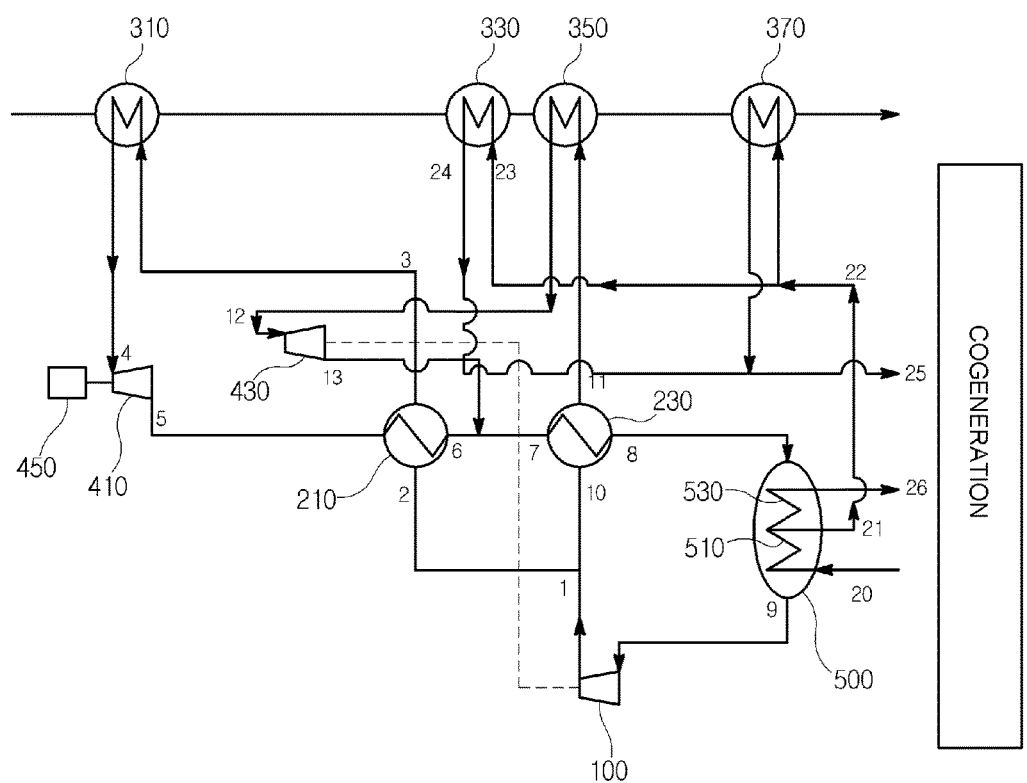

[Fig. 19]
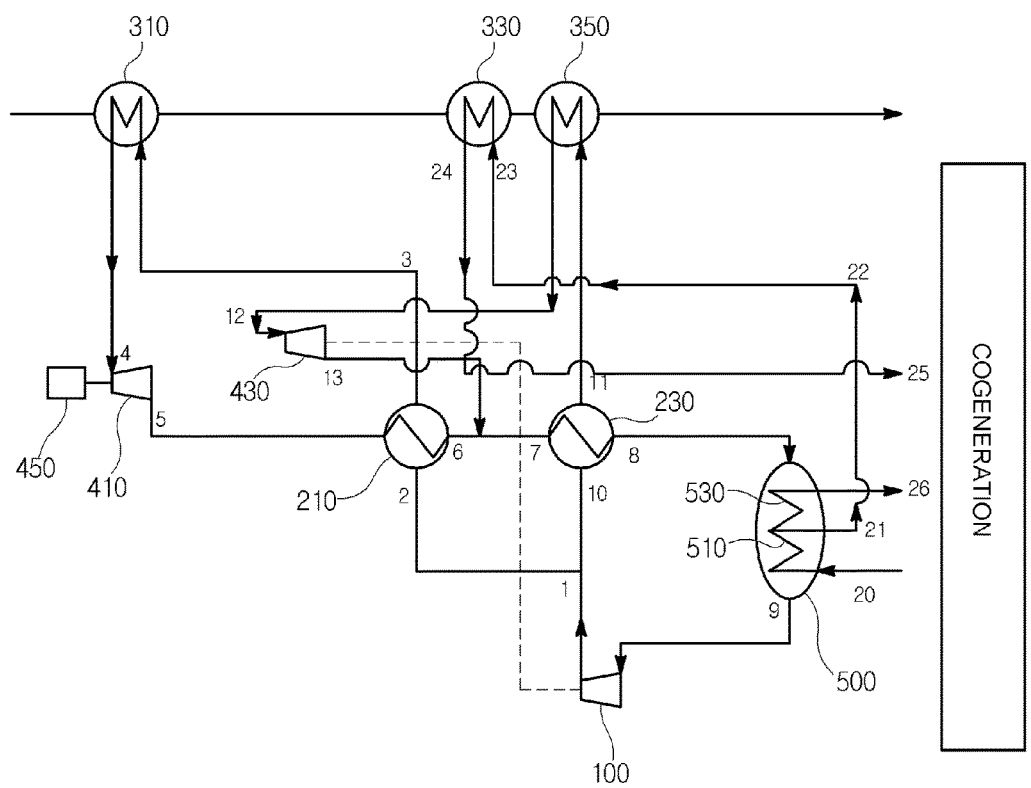

[Fig. 20]
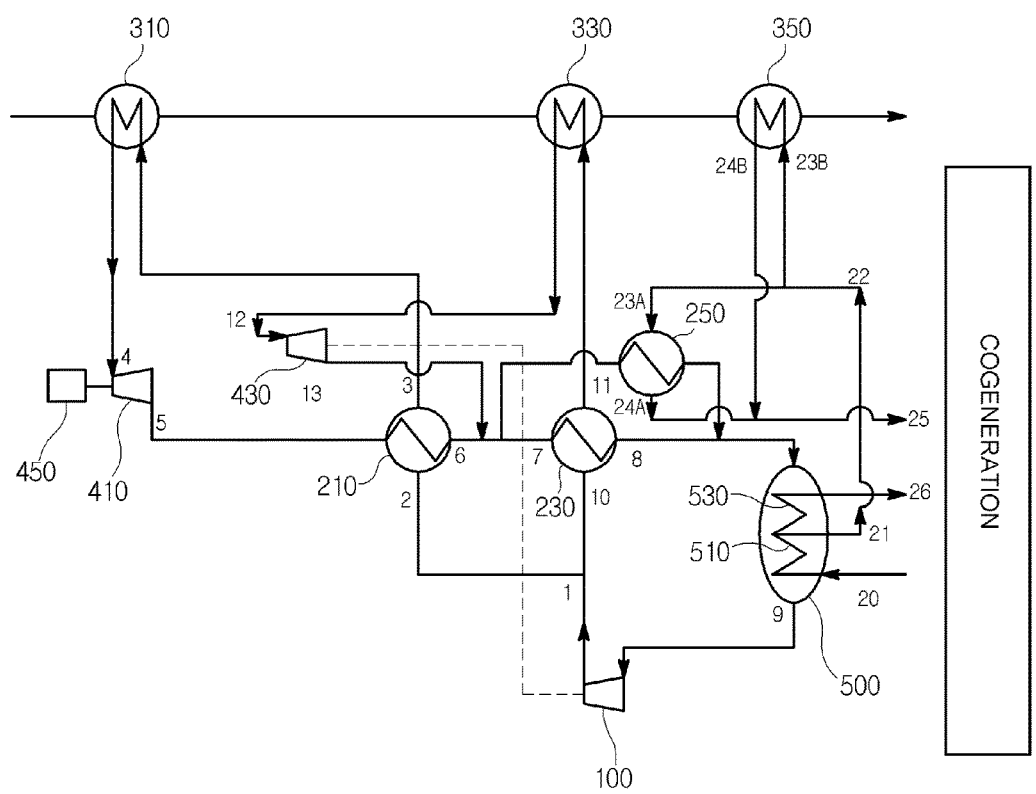

[Fig. 21]
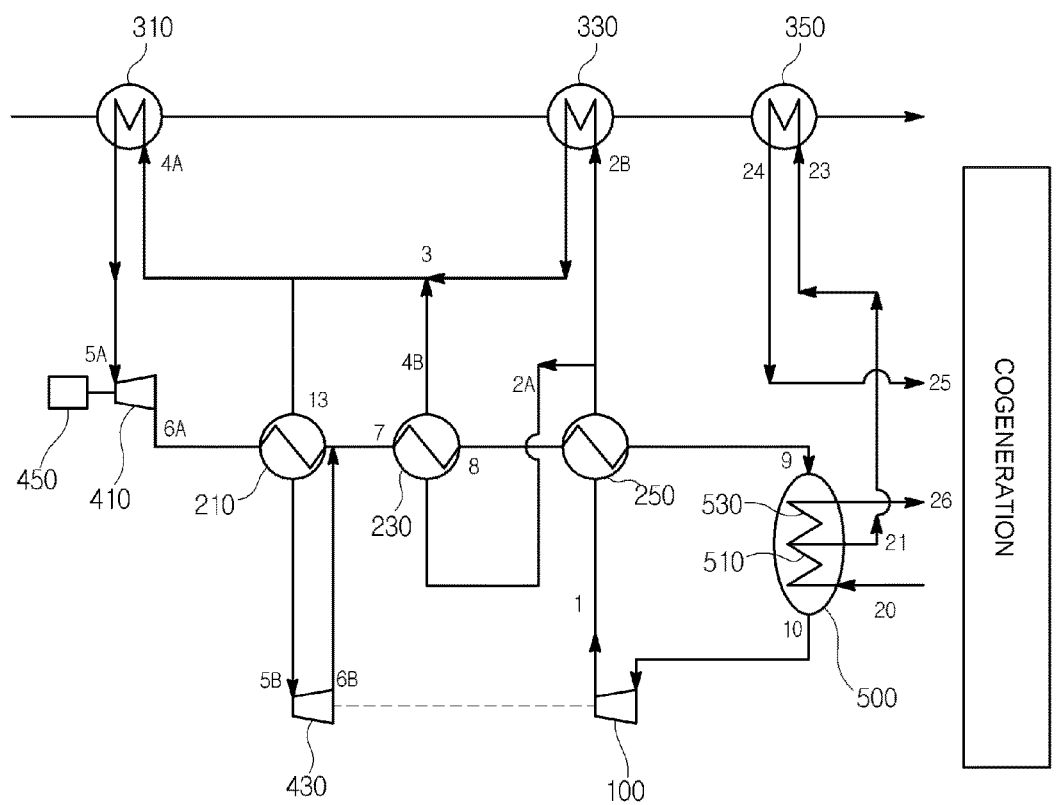

[Fig. 22]
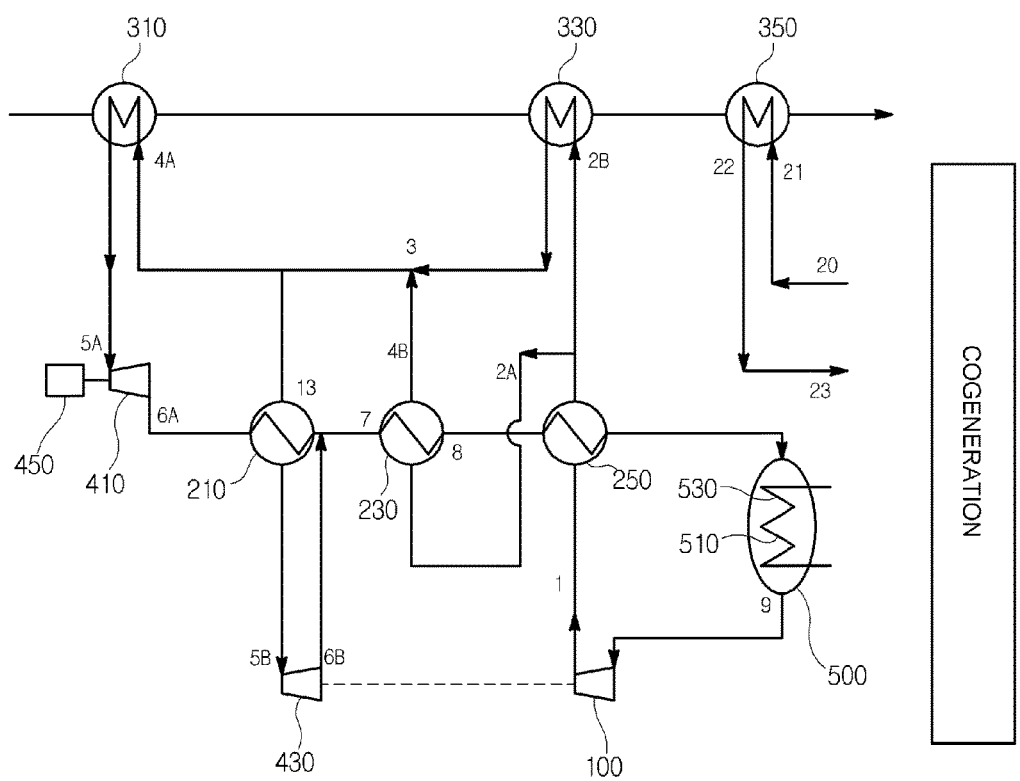

[Fig. 23]
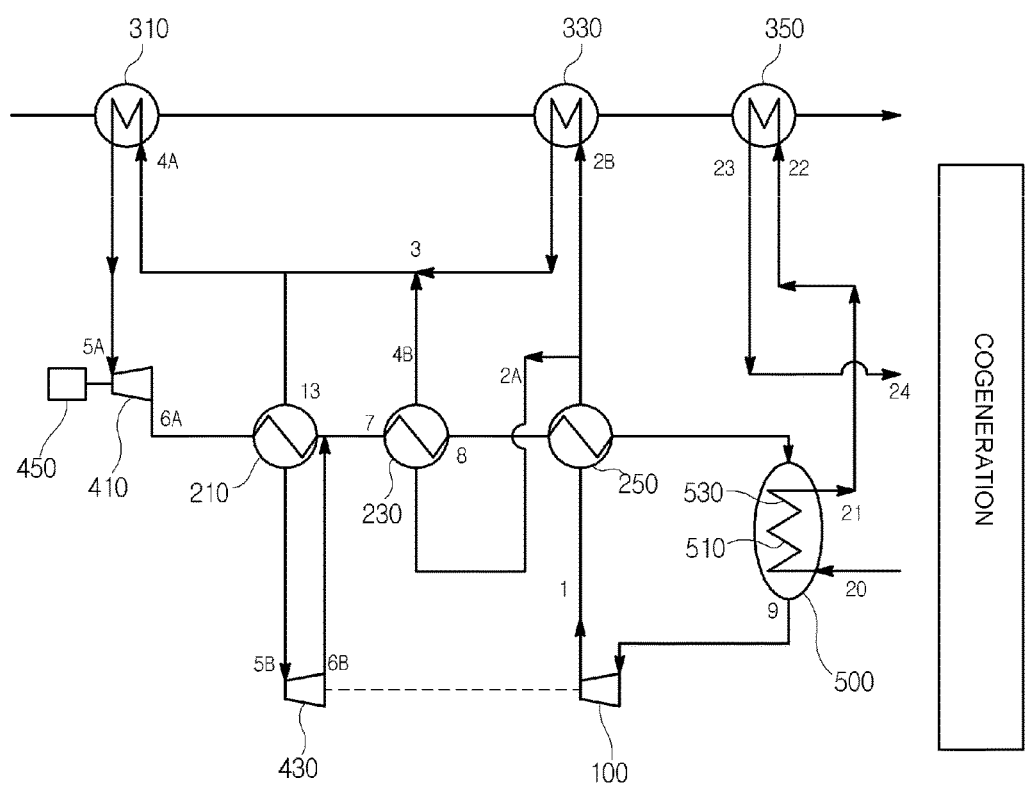

[Fig. 24]
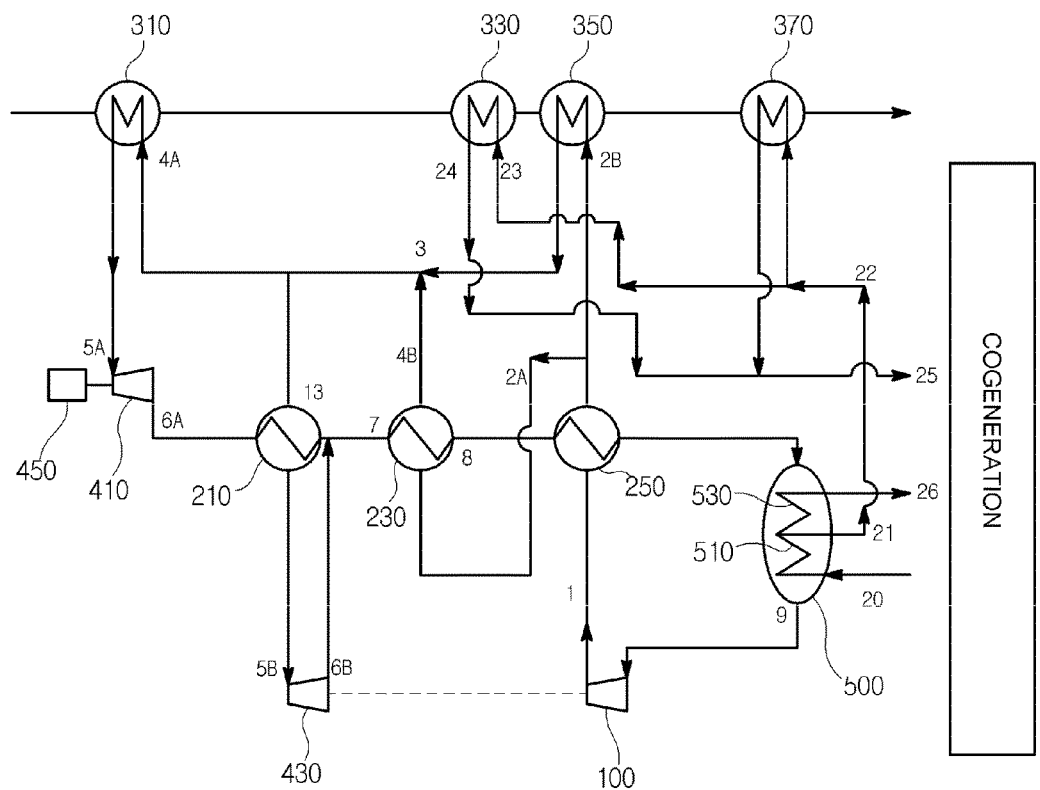

[Fig. 25]
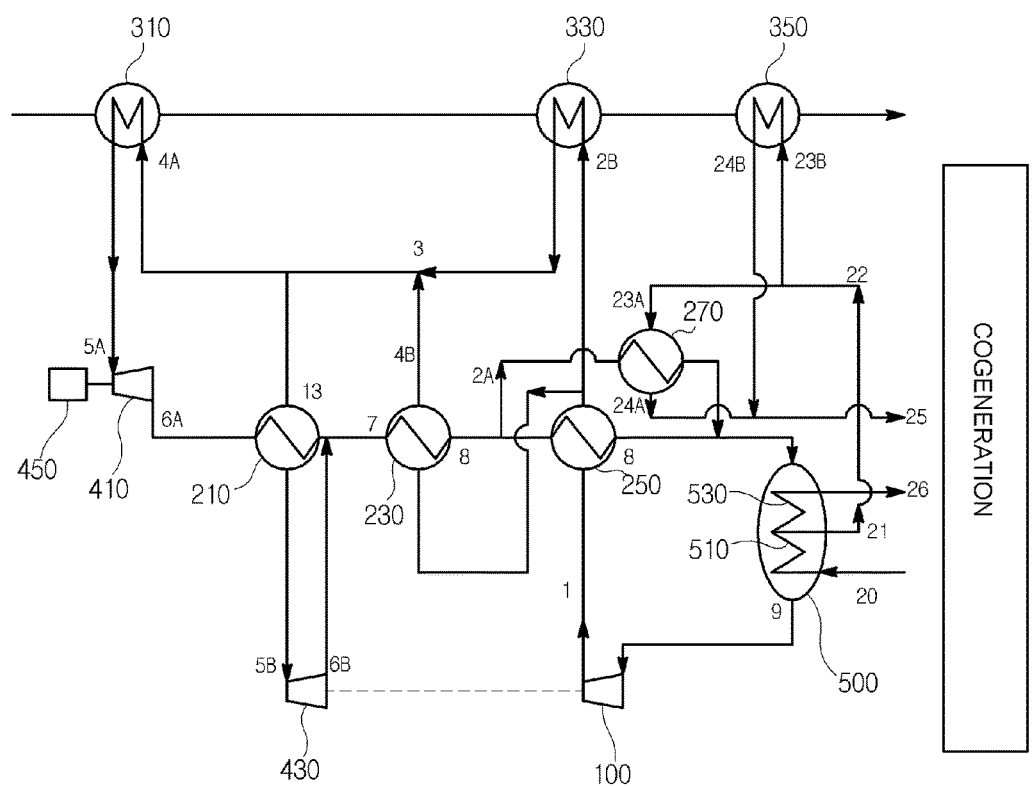

[Fig. 26]
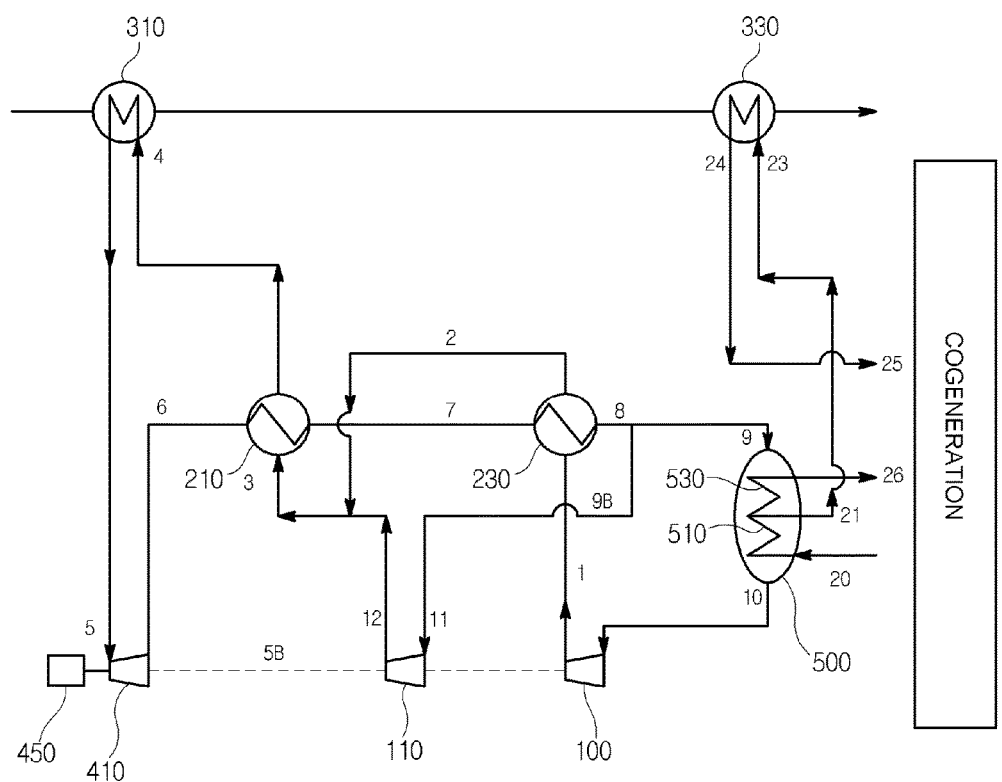

[Fig. 27]
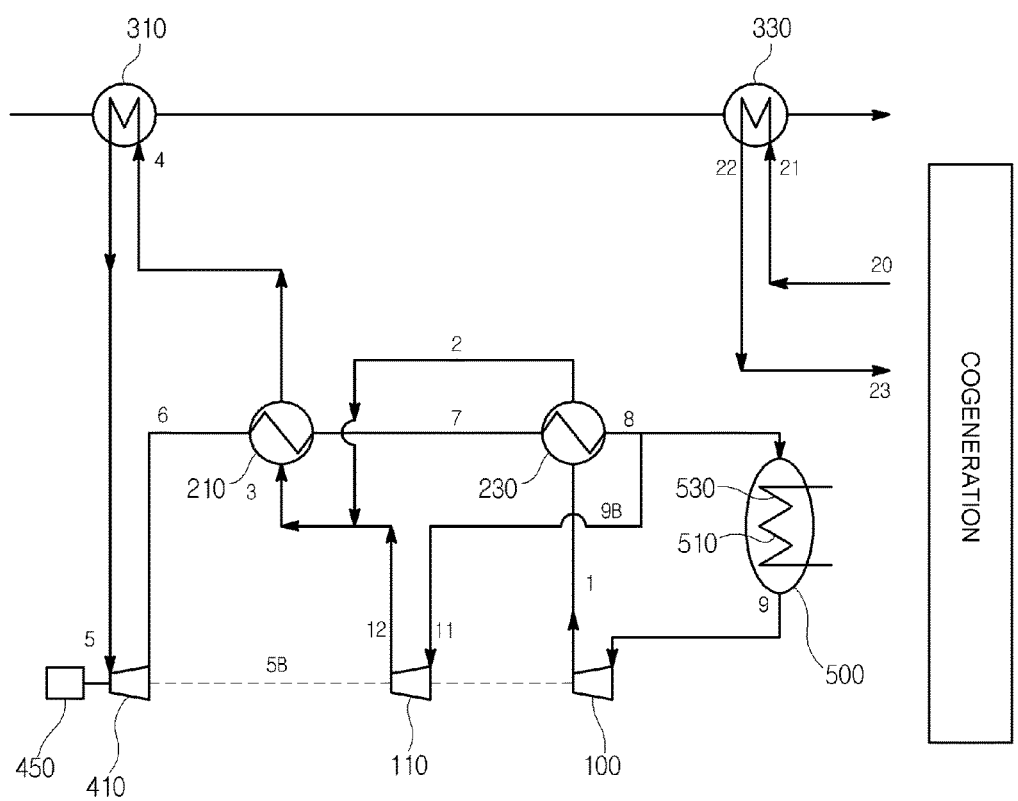

[Fig. 28]
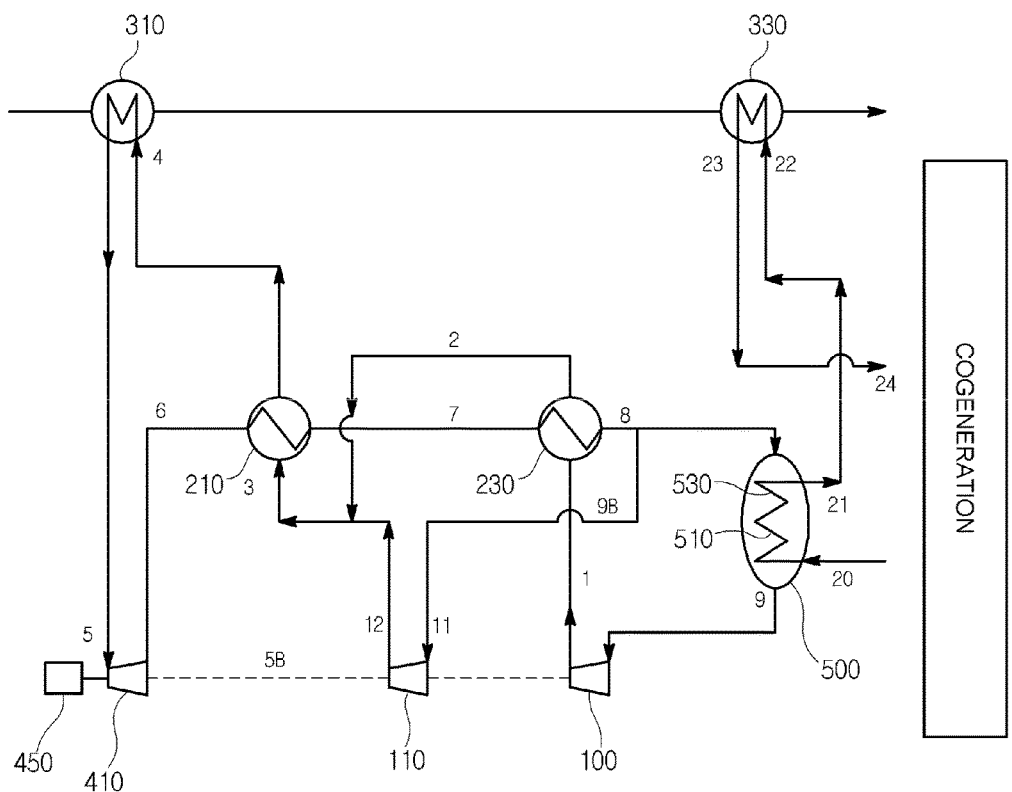

[Fig. 29]
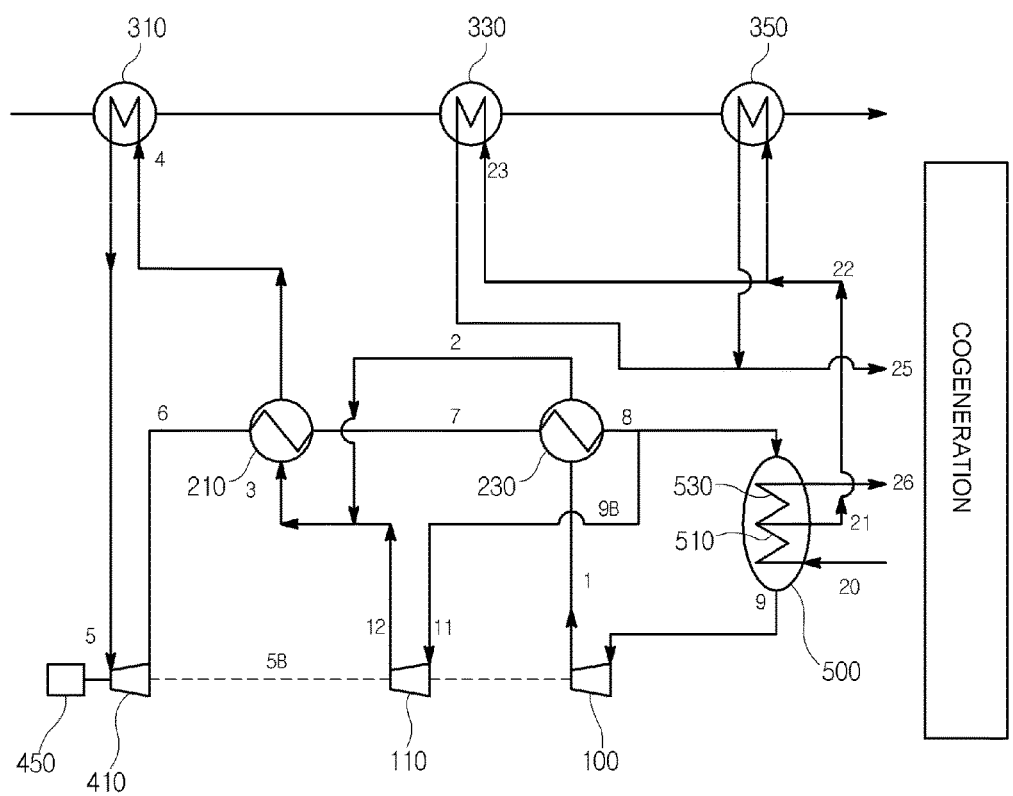

[Fig. 30]
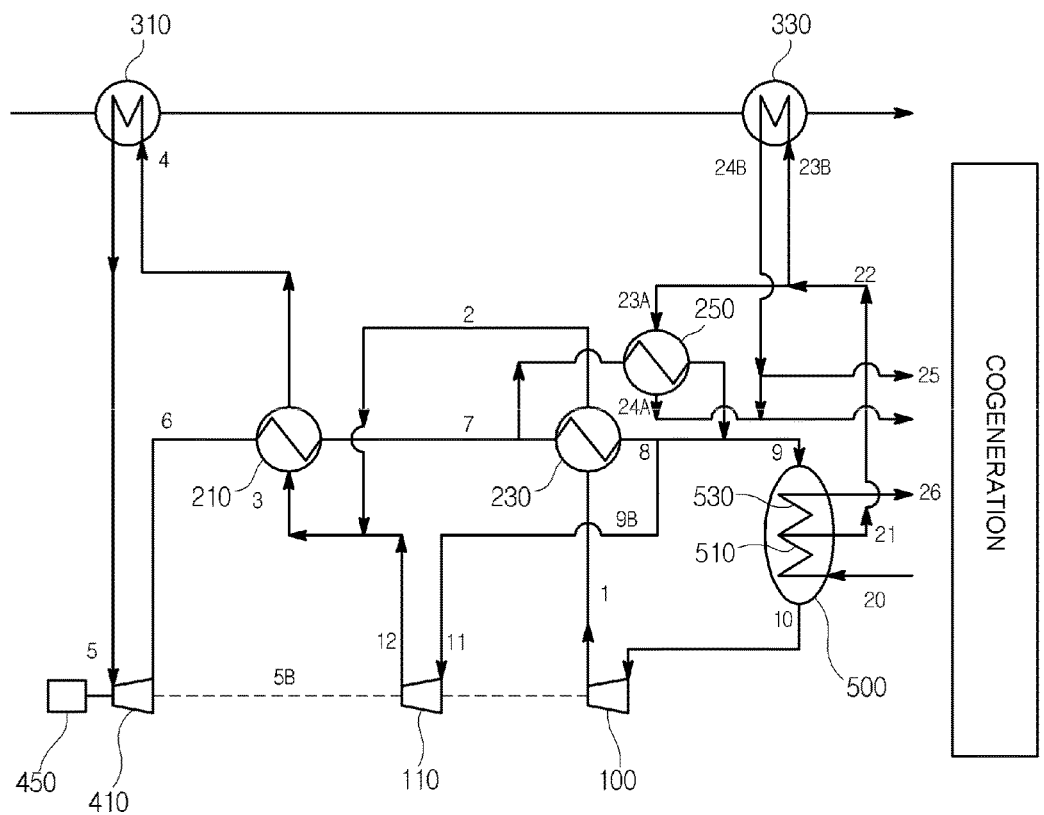

HYBRID POWER GENERATION SYSTEM

CROSS-REFERENCE TO RELATED APPLICATION

This application claims priority to Korean Patent Application No. 10-2016-0127568, filed on Oct. 4, 2016, the disclosure of which is incorporated herein by reference in its entirety.

BACKGROUND

Exemplary embodiments of the present disclosure relate to a hybrid power generation system, and more particularly, to a hybrid power generation system capable of enhancing efficiency of production of electricity and heating heat by integrated power generation using supercritical carbon dioxide ($CO_2$) and cogeneration.

Internationally, the need to efficiently produce electric power is gradually increasing, and various efforts have been made to reduce generation of pollutants and increase power production. A study on a power generation system using supercritical carbon dioxide ($CO_2$), which utilizes supercritical carbon dioxide as a working fluid is disclosed in Korean Patent Application Publication No. 2013-0036180.

Since the supercritical carbon dioxide simultaneously has a density similar to that of liquid and a viscosity similar to that of gas, it is possible to reduce the size of devices and to reduce the consumption of electric power for compression and circulation of the fluid. In addition, the supercritical carbon dioxide has an advantage in that it is very easy to handle since it has a smaller critical point of 31.4° C. and 72.8 atmospheres, compared to water having a critical point of 373.95° C. and 217.7 atmospheres.

In addition, most power generation systems using supercritical carbon dioxide are operated as a closed cycle that does not discharge carbon dioxide used for power generation to the outside, thereby significantly contributing to a reduction of pollutant discharge for each country.

However, since it is difficult for an existing power generation system using supercritical carbon dioxide to have a certain magnitude or more, the system may supply a portion of necessary electric power. In addition, it is desirable to increase production efficiency of electric power and reduce discharge of pollutants in a coal-fired thermal power generation system.

BRIEF SUMMARY

An exemplary object of the present disclosure is to provide a hybrid power generation system capable of enhancing efficiency of production of electricity and heating heat by integrated power generation using supercritical carbon dioxide ($CO_2$) and cogeneration.

Other objects and advantages of the present disclosure can be understood by the following description, and become apparent with reference to the embodiments of the present disclosure.

In accordance with one aspect of the present disclosure, a hybrid power generation system is configured by mixing a power generation system using supercritical carbon dioxide that uses supercritical carbon dioxide as a working fluid to produce electrical energy with a cogeneration system that burns fuel to produce thermal energy and electrical energy, and the hybrid power generation system includes at least one pump configured to circulate the working fluid, at least one recuperator configured to primarily heat the working fluid having passed through the pump, at least one heat exchanger configured to reheat the working fluid heated in the recuperator using waste heat as a heat source, a plurality of turbines driven by the working fluid reheated in the heat exchanger, and a combined heat exchanger configured to exchange heat between heating water in the cogeneration system and the working fluid to heat the heating water and cool the working fluid, wherein the working fluid having passed through the turbines is cooled by heat exchange with the working fluid having passed through the pump in the recuperator, and is then supplied to the combined heat exchanger, and the power generation system using supercritical carbon dioxide and the cogeneration system share the combined heat exchanger.

The working fluid having passed through the combined heat exchanger may be circulated to the pump.

The heating water may be heated by at least one of the recuperator and the heat exchanger and then be supplied to the cogeneration system.

After the heating water is introduced into the combined heat exchanger from the cogeneration system, some or all of the introduced heating water may be supplied to the recuperator or the heat exchanger, or may branch off and be respectively supplied to the combined heat exchanger and the recuperator or heat exchanger.

After the working fluid having passed through the pump is primarily heated in the recuperator, and is delivered to the heat exchanger to be secondarily heated therein, the heated working fluid may branch off to be respectively supplied to the plurality of turbines.

The recuperator and the heat exchanger may include a plurality of recuperators and heat exchangers, and after the working fluid having passed through the pump branches off to the plurality of recuperators to be primarily heated therein, the heated working fluids may be respectively supplied to the plurality of heat exchangers to be secondarily heated therein, and then be supplied to the respective plurality of turbines.

The recuperator and the heat exchanger may include a plurality of recuperators and heat exchangers, and after the working fluid having passed through the pump branches off to the plurality of recuperators to be primarily heated therein, the heated working fluids may be respectively supplied to the plurality of heat exchangers to be secondarily heated therein, and then be supplied to the plurality of turbines or at least one of the recuperators, respectively.

The working fluid having passed through the turbines may be introduced into the recuperator.

The heat exchanger may include a plurality of heat exchangers, and the heat exchangers may be arranged in sequence from an introduction portion of waste heat gas to a discharge portion thereof.

The recuperator may include a plurality of recuperators arranged in sequence, and the working fluid having passed through the turbines may be cooled while passing through the recuperators in sequence.

In accordance with another aspect of the present disclosure, a hybrid power generation system is configured by mixing a power generation system using supercritical carbon dioxide that uses supercritical carbon dioxide as a working fluid to produce electrical energy with a cogeneration system that burns fuel to produce thermal energy and electrical energy, and the hybrid power generation system includes at least one pump configured to circulate the working fluid, at least one recuperator configured to primarily heat the working fluid having passed through the pump, at least one heat exchanger configured to reheat the working fluid heated in the recuperator using waste heat as a heat source, a single turbine driven by the working fluid reheated in the heat exchanger, and a combined heat exchanger configured to exchange heat between heating water in the cogeneration system and the working fluid to heat the heating water and cool the working fluid, wherein the working fluid having passed through the turbine is cooled by heat exchange with the working fluid having passed through the pump in the recuperator, and is then supplied to the combined heat exchanger, and the power generation system using supercritical carbon dioxide and the cogeneration system share the combined heat exchanger.

The working fluid having passed through the combined heat exchanger may be circulated to the pump.

The heating water may be heated by at least one of the recuperator and the heat exchanger and is then supplied to the cogeneration system.

After the heating water is introduced into the combined heat exchanger from the cogeneration system, some or all of the introduced heating water may be supplied to the recuperator or the heat exchanger, or may branch off and be respectively supplied to the combined heat exchanger and the recuperator or heat exchanger.

After the working fluid having passed through the pump is primarily heated in the recuperator, and is delivered to the heat exchanger to be secondarily heated therein, the heated working fluid may be supplied to the turbine.

The pump, the recuperator, and the heat exchanger may include a plurality of pumps, recuperators, and heat exchangers, the working fluids branched off from a front end of the combined heat exchanger may be supplied to a high-temperature-side pump of the pumps, and the working fluid having passed through a low-temperature-side pump of the pumps may be primarily heated by a low-temperature-side recuperator of the recuperators, and then be mixed with the working fluid having passed through the high-temperature-side pump to be secondarily heated by a high-temperature-side recuperator of the recuperators.

The working fluid, which is secondarily heated by the high-temperature-side recuperator of the recuperators, may be suppled to one of the heat exchangers to be reheated therein, and then be supplied to the turbine.

The working fluid having passed through the turbine may be introduced into at least one of the recuperators.

The heat exchanger may include a plurality of heat exchangers, and the heat exchangers may be arranged in sequence from an introduction portion of waste heat gas to a discharge portion thereof.

The recuperator may include a plurality of recuperators arranged in sequence, and the working fluid having passed through the turbine may be cooled while passing through the recuperators in sequence.

It is to be understood that both the foregoing general description and the following detailed description are exemplary and explanatory and the disclosure is not limited to the embodiments.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram schematically illustrating a hybrid power generation system according to a first embodiment of the present disclosure;

FIG. 2 is a diagram schematically illustrating a modified example of the first embodiment;

FIG. 3 is a diagram schematically illustrating a modified example of the first embodiment;

FIG. 4 is a diagram schematically illustrating a modified example of the first embodiment;

FIG. 5 is a diagram schematically illustrating a hybrid power generation system according to a second embodiment of the present disclosure;

FIG. 6 is a diagram schematically illustrating a modified example of the second embodiment;

FIG. 7 is a diagram schematically illustrating a hybrid power generation system according to a third embodiment of the present disclosure;

FIG. 8 is a diagram schematically illustrating a modified example of the third embodiment;

FIG. 9 is a diagram schematically illustrating a hybrid power generation system according to a fourth embodiment of the present disclosure;

FIG. 10 is a diagram schematically illustrating a modified example of the fourth embodiment;

FIG. 11 is a diagram schematically illustrating a modified example of the fourth embodiment;

FIG. 12 is a diagram schematically illustrating a modified example of the fourth embodiment;

FIG. 13 is a diagram schematically illustrating a hybrid power generation system according to a fifth embodiment of the present disclosure;

FIG. 14 is a diagram schematically illustrating a hybrid power generation system according to a sixth embodiment of the present disclosure;

FIG. 15 is a diagram schematically illustrating a hybrid power generation system according to a seventh embodiment of the present disclosure;

FIG. 16 is a diagram schematically illustrating a modified example of the seventh embodiment;

FIG. 17 is a diagram schematically illustrating a modified example of the seventh embodiment;

FIG. 18 is a diagram schematically illustrating a hybrid power generation system according to an eighth embodiment of the present disclosure;

FIG. 19 is a diagram schematically illustrating a modified example of the eighth embodiment;

FIG. 20 is a diagram schematically illustrating a hybrid power generation system according to a ninth embodiment of the present disclosure;

FIG. 21 is a diagram schematically illustrating a hybrid power generation system according to a tenth embodiment of the present disclosure;

FIG. 22 is a diagram schematically illustrating a modified example of the tenth embodiment;

FIG. 23 is a diagram schematically illustrating a modified example of the tenth embodiment;

FIG. 24 is a diagram schematically illustrating a hybrid power generation system according to an eleventh embodiment of the present disclosure;

FIG. 25 is a diagram schematically illustrating a hybrid power generation system according to a twelfth embodiment of the present disclosure;

FIG. 26 is a diagram schematically illustrating a hybrid power generation system according to a thirteenth embodiment of the present disclosure;

FIG. 27 is a diagram schematically illustrating a modified example of the thirteenth embodiment;

FIG. 28 is a diagram schematically illustrating a modified example of the thirteenth embodiment;

FIG. 29 is a diagram schematically illustrating a hybrid power generation system according to a fourteenth embodiment of the present disclosure; and FIG. 30 is a diagram schematically illustrating a hybrid power generation system according to a fifteenth embodiment of the present disclosure.

DETAILED DESCRIPTION

A hybrid power generation system according to exemplary embodiments of the present disclosure will be described below in more detail with reference to the accompanying drawings. Throughout the disclosure, like reference numerals refer to like components throughout the various figures and embodiments, and an overlapped description for the same components may be omitted. In addition, in the case where the system includes a plurality of waste heat recovery heat exchangers that use waste heat gas as a heat source, they may be arranged in sequence from a high-temperature region to a low-temperature region.

In general, a power generation system using supercritical carbon dioxide forms a closed cycle, in which the carbon dioxide used for power generation is not discharged to the outside, and uses supercritical carbon dioxide as a working fluid.

The power generation system using supercritical carbon dioxide may use exhaust gas discharged from a thermal power plant and the like since it uses supercritical carbon dioxide as a working fluid, and may therefore be used in a hybrid power generation system combined with the thermal power plant as well as an independent power generation system. The working fluid in the power generation system using supercritical carbon dioxide may be carbon dioxide, which is separated from exhaust gas, for supply to the system, or may be separate carbon dioxide for supply to the system.

The supercritical carbon dioxide (hereinafter, referred to as "working fluid" without limitation as it will be understood that other fluids may also be used) in the cycle is heated while passing through a heat source such as a heater after passing through a compressor, with the consequence that the working fluid becomes a high-temperature and high-pressure working fluid to drive a turbine. The turbine is connected to a generator or a pump, so that electric power is produced by the turbine and the pump is driven by the turbine connected thereto. The working fluid, which has passed through the turbine, is cooled while passing through a heat exchanger, and the cooled working fluid returns back to the compressor so as to circulate in the cycle. The turbine or heat exchanger may include a plurality of turbines or heat exchangers.

The power generation system using supercritical carbon dioxide referred to in the specification according to various embodiments also includes a system, in which most of working fluids are supercritical fluids and another portion is a subcritical fluid, as well as a system in which all working fluids flowing in a cycle are supercritical fluids.

In addition, carbon dioxide may be used as a working fluid in the various embodiments of the present disclosure. The "carbon dioxide" used in the specification includes pure carbon dioxide in the chemical viewpoint, carbon dioxide with few impurities in the general viewpoint, and carbon dioxide mixed with one or more fluids as additives.

The respective components of the present disclosure are connected by transfer pipes (lines designated by reference numerals 1 to 27 in FIG. 1 indicating the transfer pipes), in which a working fluid flows, and it should be understood that the working fluid flows along the transfer pipes unless otherwise mentioned. In the case where the components are integrated with each other, there may be part(s) or region(s) serving as the transfer pipes in the integrated component. Even in this case, it should be understood that the working fluid flows along the transfer pipes. Separately functioning passages may be additionally described. The flow of the working fluid will be described with reference to the reference numerals of the transfer pipes.

In addition, since a working fluid temperature described in the present disclosure is by way of example only, it should not be understood that the temperature is an absolute temperature value.

The present disclosure includes a hybrid power generation system which includes a plurality of heat exchangers (heaters) using waste heat gas as a heat source, and in which both of a power generation system using supercritical carbon dioxide and a cogeneration system (power generation system for district heating) share the heater of the cogeneration system in place of the condenser of the power generation system using supercritical carbon dioxide.

FIG. 1 is a diagram schematically illustrating a hybrid power generation system according to a first embodiment of the present disclosure.

As illustrated in FIG. 1, the hybrid power generation system according to the first embodiment uses carbon dioxide as a working fluid, and may include a pump 100 that circulates the working fluid, a plurality of recuperators and heat exchangers that exchange heat with the working fluid having passed through the pump 100, a plurality of turbines that are driven by the working fluid heated through the recuperators and the heat exchangers, a generator 450 that is driven by the turbines to produce electric power, and a combined heat exchanger 500 that cools the working fluid introduced into the pump 100. The combined heat exchanger 500 is a heat exchanger that serves as a heat exchanger in a power generation system using supercritical carbon dioxide and simultaneously serves as a heater to heat heating water in a cogeneration system, and a description thereof will be described later.

The pump 100 is driven by a low-pressure turbine 430 to be described later (see the dotted line in FIG. 1), and serves to deliver the low-temperature working fluid cooled via the combined heat exchanger 500 to the recuperators or the heat exchangers. The present embodiment will be described with respect to a working fluid branching off to be delivered to two recuperators. Preferably, a three-way valve or two two-way valves are controllably installed at the rear end of the pump 100 (at a branch point from which the working fluid branches off to the two recuperators) to select a circulation passage of the working fluid.

The recuperators primarily cool the working fluid that has passed through the turbines by exchanging heat between the working fluid, which is cooled from high temperature to intermediate temperature while expanding through the turbines, and the working fluid having passed through the pump 100, and the working fluid that has passed through the pump 100 recuperates heat. The cooled working fluid is delivered to the combined heat exchanger 500 to be secondarily cooled, and is then delivered to the pump 100. The working fluid delivered to the recuperators through the pump 100 is primarily heated by heat exchange with the working fluid having passed through the turbines, and is supplied to a heat exchanger to be described later. An example in which each of the turbines and recuperators is two in number will be described in the present embodiment.

A first recuperator 210 and a second recuperator 230 are installed in series, and the working fluid having passed through the pump 100 branches off to be introduced into the respective first and second recuperators 210 and 230.

In the first recuperator 210, a portion of the working fluid having passed through the pump 100 exchanges heat with the working fluid having passed through the turbines. The working fluid, which has passed through a high-pressure turbine 410, and the working fluid, which has passed through a low-pressure turbine 430, are mixed and introduced into the first recuperator 210. The working fluid, which is mixed after passing through the high-pressure and low-pressure turbines 410 and 430, heats the working fluid having passed the pump 100. The working fluid, which is primarily heated in the first recuperator 210 via the pump 100, is introduced into one of heat exchangers to be described later, and the working fluid, which allows the working fluid having passed through the pump 100 to recuperate heat, is introduced via the first recuperator 210 into the second recuperator 230.

In the second recuperator 230, a portion of the working fluid having passed through the pump 100 exchanges heat with the working fluid having passed through the first recuperator 210. That is, the working fluid having passed through the first recuperator 210 allows the working fluid having passed through the pump 100 to recuperate heat in the second recuperator 230. The heated working fluid is introduced into one of heat exchangers to be described later, and the working fluid, which allows the working fluid having passed through the pump 100 to recuperate heat, is delivered to the combined heat exchanger 500. That is, the working fluid, which is cooled through the first and second recuperators 210 and 230 in sequence after passing through the turbines, is introduced into the combined heat exchanger 500, and is then resupplied to the pump 100.

The system may include a plurality of heat exchangers as occasion demands, and an example in which there are provided three heat exchangers will be described in the present embodiment. First to third heat exchangers 310, 330, and 350 use an external heat source such as exhaust gas discharged from boilers of power plants. The first to third heat exchangers 310 to 350 use gas having waste heat (hereinafter, referred to as "waste heat gas") as a heat source, and serve to heat a working fluid with heat supplied from the waste heat gas by heat exchange between the waste heat gas and the working fluid circulating in the cycle. A heat exchanger that uses waste heat gas in the cogeneration system may be used as a heat source.

In addition, the first to third heat exchangers 310 to 350 may be classified into relatively low, intermediate, and high-temperature heat exchangers according to the temperature of waste heat gas. That is, a heat exchanger performs high-temperature heat exchange as it is close to an inlet end for introduction of waste heat gas, whereas a heat exchanger performs low-temperature heat exchange as it is close to an outlet end for discharge of waste heat gas.

An example in which the first heat exchanger 310 is a relatively high-temperature heat exchanger compared to other heat exchangers, the second heat exchanger 330 is a relatively intermediate-temperature heat exchanger, and the third heat exchanger 350 is a relatively low-temperature heat exchanger will be described in the present embodiment. In more detail, an example in which the first, second, and third heat exchangers 310, 330, and 350 are arranged in sequence toward the outlet end from the inlet end for introduction of waste heat gas will be described.

The first heat exchanger 310 heats the working fluid that is primarily heated through the first recuperator 210 by heat of waste heat gas. The working fluid heated by the first heat exchanger 310 drives the high-pressure turbine 410 and is then transferred to the first recuperator 210. The second heat exchanger 330 heats the working fluid that is primarily heated through the second recuperator 230 by heat of waste heat gas. The working fluid heated by the second heat exchanger 330 drives the low-pressure turbine 430 and is then transferred to the first recuperator 210. The third heat exchanger 350 serves to heat a portion of the heating water, which has passed through the combined heat exchanger 500, by heat of waste heat gas.

The turbines are the high-pressure turbine 410 and the low-pressure turbine 430, and are driven by a working fluid to drive the generator 450 connected to at least one of the turbines, thereby producing electric power. Since the working fluid expands while passing through the high-pressure and low-pressure turbines 410 and 430, the turbines 410 and 430 also serve as expanders. In the present embodiment, the generator 450 is connected to the high-pressure turbine 410 to produce electric power, and the low-pressure turbine 430 serves to drive the pump 100.

Here, it should be understood that the terms "high-pressure turbine" and "low-pressure turbine" have a relative meaning rather than having a specific pressure as a reference value.

The combined heat exchanger 500 is a heat exchanger that heats heating water in the cogeneration system by depriving the working fluid in the power generation system using supercritical carbon dioxide of heat, and cools the working fluid having passed through the second recuperator 230. That is, the combined heat exchanger 500 serves as a cooler that cools a working fluid at the side of the power generation system using supercritical carbon dioxide, and serves as a heater that heats heating water at the side of the cogeneration system. The working fluid cooled through the combined heat exchanger 500 is reintroduced into the pump 100.

The combined heat exchanger 500 may include a first heater 510 and a second heater 530. The heating water introduced into the first heater 510 may flow into the cogeneration system via the second heater 530, or the heating water having passed through the first heater 510 may partially branch off to flow into the cogeneration system after it is heated through the heat exchanger.

The cogeneration system includes a power generation system that drives a generator by a steam turbine in a thermal power plant to perform district heating using hot exhaust heat of the turbine. The cogeneration system produces electricity by driving the steam turbine using steam generated by burning fossil fuel and heating water, and uses coolant as the water for heating. The cogeneration system also includes a heat exchanger that exchanges heat between heating water and steam for driving a turbine. An example in which at least one of a plurality of heat exchangers is supplied with extra heat from the power generation system using supercritical carbon dioxide will be described in the present embodiment.

When heating water is introduced into the combined heat exchanger 500, the heating water exchanges heat with the working fluid passing through the combined heat exchanger 500 in the power generation system using supercritical carbon dioxide. The heating water introduced into the combined heat exchanger 500 is heated by heat received from the working fluid in the first heater 510 (20), and the working fluid is cooled. The cooled working fluid is reintroduced into the pump 100 (9). The heating water heated by the first heater 510 branches off in the combined heat exchanger 500 so that a portion thereof is heated by the second heater 530 and is then transferred to the cogeneration system (26). A portion of the branched heating water may be delivered to the third heat exchanger 350 (21 and 23) to be reheated therein, and then be transferred to the cogeneration system (24 and 25). The heating water, which branches off in the combined heat exchanger 500 to be transferred to the cogeneration system, and the heating water, which is reheated by the third heat exchanger 350 and is then transferred to the cogeneration system, may be mixed and used, or may be utilized for different purposes at different temperatures.

The heating water, which is heated by the second heater 530 and is then discharged, and the heating water, which is reheated by the third heat exchanger 350, may also be first mixed and then be delivered to the cogeneration system, although not shown in the drawing.

The flow of a working fluid and heating water will be described below.

The low-temperature working fluid, which is cooled while passing through the pump 100 (1), branches off to the first and second recuperators 210 and 230 (2 and 10). The working fluid, which is primarily heated while passing through the first recuperator 210, is delivered to the first heat exchanger 310 (3) to be secondarily heated by heat exchange with waste heat gas. Since the first heat exchanger 310 uses high-temperature waste heat gas for heat exchange, the working fluid, which is heat-exchanged in the first heat exchanger 310, is a high-temperature working fluid. The working fluid having passed through the first heat exchanger 310 is delivered to the high-pressure turbine 410 (4) to drive the high-pressure turbine 410, and the generator 450 is driven by the driving of the high-pressure turbine 410 to produce electric power. The working fluid having passed through the high-pressure turbine 410 is delivered to the first recuperator 210 (5) to exchange heat with the working fluid having passed through the pump 10, and is then introduced into the second recuperator 230 (6).

The working fluid, which is delivered to the second recuperator 230 (10) to be primarily heated therein, is transferred to the second heat exchanger 330 (11) to exchange heat with waste heat gas. Since the second heat exchanger 330 uses intermediate-temperature waste heat gas for heat exchange, the working fluid, which is heat-exchanged in the second heat exchanger 330, is an intermediate-temperature working fluid. The working fluid having passed through the second heat exchanger 330 is delivered to the low-pressure turbine 430 (12) to drive the low-pressure turbine 430. The low-pressure turbine 430 provides a driving force to the pump 100 (3). The working fluid having passed through the low-pressure turbine 430 is mixed with the working fluid having passed through the high-pressure turbine 410 (13), and is delivered to the first recuperator 210.

The working fluid introduced into the first recuperator 210 heats the working fluid, which is introduced into the first recuperator 210 from the pump 100, and is then transferred to the second recuperator 230 (7). The working fluid introduced into the second recuperator 230 heats the working fluid, which is introduced into the second recuperator 230 from the pump 100, and is then delivered to the combined heat exchanger 500 (8).

The working fluid delivered to the combined heat exchanger 500 is cooled by heat exchange with heating water in the combined heat exchanger 500, and is then redelivered to the pump 100 (9). After the heating water introduced into the combined heat exchanger 500 in the cogeneration system (20) is heated by a working fluid, a portion of the heating water is directly transferred to the cogeneration system (26) and a portion thereof is transferred to the third heat exchanger 350 (23). The third heat exchanger 350 is a low-temperature side heat exchanger. The third heat exchanger 350 may be an insufficient heat source to generate a high-temperature and high-pressure working fluid, but may be a sufficient heat source to heat heating water in the cogeneration system. The heating water heated by the third heat exchanger 350 (24) is transferred to the cogeneration system (25). The heating water, which has passed through the combined heat exchanger 500, and the heating water, which has passed through the third heat exchanger 350, may be mixed and used so as to have a preferred temperature, or may be utilized for different purposes at different temperatures.

The operation method of the hybrid power generation system having the above-mentioned configuration will be described below.

The hybrid power generation system may operate the power generation system using supercritical carbon dioxide without a separate condenser. Therefore, it is possible to reduce installation costs and facility maintenance costs, and to generate heating water that satisfies the temperature for district heating.

A method of heating the heating water using the above-mentioned combined heat exchanger and waste heat recovery heat exchanger or recuperators of the power generation system using supercritical carbon dioxide (which will be described later), and of properly mixing and using them may provide water of the temperature for district heating.

It is also possible to heat the heating water by supplying a portion of heating water, which is introduced into the combined heat exchanger 500 (20), to an economizer of the cogeneration system (26).

For example, when the temperature of heating water for district heating is preferred to be 100° C. to 120° C., the heating water having a temperature of 40° C. is heated to a temperature of 70° C. in the first heater 510 to partially branch off to the second heater 530, and another portion may branch off to the economizer. 60% heating water may be heated to a temperature of 110° C. while passing through the second heater 530, and 40% heating water may branch off to the economizer to be heated to a temperature of 110° C. The heating water and the other heating water, which reach the preferred temperature by the above heating, may be mixed and used for district heating.

In this case, the heating water branched off to the second heater 530 may be heated by the second heater 530, or may be additionally heated by the third heat exchanger 350.

After heating water is heated to a temperature lower than the preferred temperature in the combined heat exchanger 500 and heating water is heated to a temperature higher than the preferred temperature in the economizer, they may also be mixed with each other in order to enhance output of the power generation system using supercritical carbon dioxide.

For example, after heating water having a temperature of 40° C. is introduced into the combined heat exchanger 500, it is heated to a temperature of 70° C. in the first heater 510 to partially branch off to the second heater 530, and another portion may branch off to the economizer. 60% heating water may be heated to a temperature of 90° C. while passing through the second heater 530, and 40% heating water may branch off to the economizer to be heated to a temperature of 135° C. After the heating water and the other heating water, which reach the preferred temperature by the above heating, are mixed to have a temperature of 110° C. as the preferred temperature, it may be used for district heating.

The above-mentioned operation method may be commonly applied to all embodiments of the present disclosure.

FIGS. 2 to 4 are diagrams schematically illustrating modified examples of the first embodiment.

As illustrated in FIGS. 2 to 4, the hybrid power generation system according to the first embodiment of the present invention may be modified and operated in various manners.

As illustrated in FIG. 2, a hybrid power generation system may include two recuperators and two heat exchangers, and a power generation system using supercritical carbon dioxide and a cogeneration system may share a combined heat exchanger 500.

In this case, the hybrid power generation system has the same configuration as the first embodiment, but it does not include a third heat exchanger. Therefore, the combined heat exchanger 500 heats heating water through heat exchange with a working fluid in the power generation system using supercritical carbon dioxide by the first and second heaters 510 and 530 (20 and 21).

In addition, as illustrated in FIG. 3, a hybrid power generation system may include two recuperators and three heat exchangers, and a power generation system using supercritical carbon dioxide and a cogeneration system may share a third heat exchanger 350.

In this case, a combined heat exchanger 500 may serve as a condenser that cools a working fluid in the power generation system using supercritical carbon dioxide, and the third heat exchanger 350 may serve to heat and supply heating water in the cogeneration system (20 to 23).

In addition, as illustrated in FIG. 4, a hybrid power generation system may include two recuperators and two heat exchangers, and a power generation system using supercritical carbon dioxide and a cogeneration system may share a combined heat exchanger 500.

In this case, unlike the first embodiment, after the heating water, which is introduced into the combined heat exchanger 500 (20), is heated through first and second heaters 510 and 530, the heating water may be delivered to a third heat exchanger 350 (21 and 22) to be reheated therein. The heating water heated by the third heat exchanger 350 is delivered to the cogeneration system (23 and 24).

Hereinafter, a hybrid power generation system according to various embodiments will be described.

FIG. 5 is a diagram schematically illustrating a hybrid power generation system according to a second embodiment of the present disclosure.

As illustrated in FIG. 5, the hybrid power generation system according to the second embodiment includes two turbines, two recuperators, and four heat exchangers that use waste heat gas as a heat source, and a power generation system using supercritical carbon dioxide and a cogeneration system share a combined heat exchanger 500. The turbines are a high-pressure turbine 410 and a low-pressure turbine 430, and the recuperators are a first recuperator 210 and a second recuperator 230. The heat exchangers are first to fourth heat exchangers 310 to 370 which are arranged in sequence, the first and fourth heat exchangers 310 and 370 use high-temperature waste heat gas and low-temperature waste heat gas, respectively, and the second and third heat exchangers 330 and 350 are arranged in parallel to each other to use intermediate-temperature waste heat gas.

The working fluid having passed through a pump 100 (1) branches off to the first and second recuperators 210 and 230 (2 and 10). The working fluid branched off to the first recuperator 210 (2) is primarily heated and is then delivered to the first heat exchanger 310 (3). The high-temperature working heated by the first heat exchanger 310 drives the high-pressure turbine 410 (4), and the working fluid having passed through the high-pressure turbine 410 is introduced into the first recuperator 210 to be primarily cooled by losing heat to the working fluid having passed through the pump 100.

The working fluid branched off to the second recuperator 230 (10) is primarily heated by the second recuperator 230, and is then delivered to the third heat exchanger 350 (11) to be secondarily heated. The heated working fluid is supplied to the low-pressure turbine 430 (12). The working fluid having driven the low-pressure turbine 430 is mixed with the working fluid having passed through the high-pressure turbine 410 (13) to be delivered to the first recuperator 210.

The working fluid having passed through the first recuperator 210 is transferred to the second recuperator 230 (6 and 7) to be secondarily cooled by losing heat to the working fluid having passed through the pump 100. The working fluid having passed through the second recuperator 230 is transferred to the combined heat exchanger 500 (8). The working fluid, which is cooled by losing heat to heating water in the combined heat exchanger 500, is recirculated to the pump 100 (9).

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water may be delivered to the heat exchanger to be reheated therein, and then be transferred to the cogeneration system (25). In this case, a portion of the heating water branched off from the first heater 510 is introduced into the fourth heat exchanger 370 (22), and a portion of the remainder is introduced into the second heat exchanger 330 (23). The heating water, which is heated by the second heat exchanger 330, and the heating water, which is heated by the fourth heat exchanger 370, are mixed and transferred to the cogeneration system (25).

Since the first to fourth heat exchangers 310 to 370 are arranged in sequence from a high-temperature region to a low-temperature region, the temperature of the heating water heated by the second heat exchanger 330 is higher than the temperature of the heating water heated by the fourth heat exchanger 370. It is possible to efficiently satisfy the preferred temperature of heating water by mixing heating water having a relatively high temperature with heating water having a relatively low temperature.

FIG. 6 is a diagram schematically illustrating a modified example of the second embodiment.

As illustrated in FIG. 6, a hybrid power generation system may include two turbines, two recuperators, and three heat exchangers that use waste heat gas as a heat source, and a power generation system using supercritical carbon dioxide and a cogeneration system may share a combined heat exchanger 500. A first heat exchanger 310 uses high-temperature waste heat gas, and second and third heat exchangers 330 and 350 are arranged to use intermediate-temperature waste heat gas.

In this case, the hybrid power generation system has the same configuration and operation as the second embodiment, but it does not include a fourth heat exchanger. Therefore, the heating water branched off from the first heater 510 (21) is transferred to the second heat exchanger 330 (22 and 23) to be heated therein, and is then transferred to the cogeneration system (24 and 25).

FIG. 7 is a diagram schematically illustrating a hybrid power generation system according to a third embodiment of the present disclosure.

As illustrated in FIG. 7, the hybrid power generation system according to the third embodiment may include three recuperators and four waste heat recovery heat exchangers, and a power generation system using supercritical carbon dioxide and a cogeneration system share a combined heat exchanger 500.

In this case, the hybrid power generation system has the same configuration as the first embodiment, but the third embodiment differs from the first embodiment in terms of the flow of working fluid in a third recuperator 250. The flow of a working fluid will be described in detail below.

The working fluids having passed through the high-temperature and low-temperature turbines 410 and 430 join at the front end of a first recuperator 210 to flow into the first recuperator 210. The working fluid flowing into the first recuperator 210 heats the working fluid having passed through the pump 100 in the first recuperator 210, and is then discharged from the first recuperator 210 (6). The working fluid discharged from the first recuperator 210 branches off to second and third recuperators 230 and 250. The working fluid branched off to the second recuperator 230 (7) heats the working fluid having passed through the pump 100, and is then transferred to the combined heat exchanger 500 (8). The working fluid branched off to the third recuperator 250 heats the heating water, which is introduced into the third recuperator 250 via the combined heat exchanger 500, and then joins the working fluid having passed through the second recuperator 230 to be transferred to the combined heat exchanger 500.

After the heating water introduced into the combined heat exchanger 500 in the cogeneration system (20) is heated by the first heater 510 and then partially branches off. A portion of the branched heating water is heated by the second heater 530 to be transferred to the cogeneration system (26). Another portion of the branched heating water is transferred to the third recuperator 250 (21 to 23) to be heated in the third recuperator 250, and is then transferred to the cogeneration system (25).

FIG. 8 is a diagram schematically illustrating a modified example of the third embodiment.

As illustrated in FIG. 8, a hybrid power generation system may include three recuperators and three waste heat recovery heat exchangers, and a power generation system using supercritical carbon dioxide and a cogeneration system may share a combined heat exchanger 500.

In this case, the hybrid power generation system has the same configuration as the third embodiment, but the modified example differs from the third embodiment in that the heating water, which branches off in the combined heat exchanger 500, partially branches off to a third heat exchanger 350 before it is transferred to a third recuperator 250.

The heating water heated by the combined heat exchanger 500 partially branches off to the third heat exchanger 350 (22 and 23B), and a portion of the branched heating water is directly transferred to the third recuperator 250 (23A). The heating water heated by the third heat exchanger 350 (24B) is mixed with the heating water heated through the third recuperator 250 (24A) to be transferred to the cogeneration system.

FIG. 9 is a diagram schematically illustrating a hybrid power generation system according to a fourth embodiment of the present disclosure.

As illustrated in FIG. 9, the hybrid power generation system according to the fourth embodiment may be configured such that the working fluid heated through a single recuperator and waste heat recovery heat exchangers branches off and is supplied to two turbines. In the present embodiment, the hybrid power generation system may include two heat exchangers that use waste heat gas as a heat source, and a power generation system using supercritical carbon dioxide and a cogeneration system may share a combined heat exchanger 500. A detailed description thereof will be given as follows.

The working fluid having passed the pump 100 is primarily heated through a recuperator 210 (1), and is transferred to a first heat exchanger 310 (2). The working fluid, which is secondarily heated by the first heat exchanger 310 (3), branches off to high-pressure and low-pressure turbines 410 and 430 (4A and 4B). The working fluids having driven the high-pressure and low-pressure turbines 410 and 430 (5A and 5B) join at the front end of the recuperator 210 (6) to be transferred to the recuperator 210.

The working fluid transferred to the recuperator 210 (7) is cooled by losing heat to the working fluid having passed through the pump 100, and is then delivered to the combined heat exchanger 500 (8). The working fluid is recooled by heat exchange with heating water in the combined heat exchanger 500, and is then recirculated to the pump 100.

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water may be delivered to a second heat exchanger 330 (23) to be reheated therein, and then be transferred to the cogeneration system (24 and 25).

The heating water, which is heated by the second heater 530 and then discharged therefrom, and the heating water, which is reheated by the second heat exchanger 330, may also be first mixed with each other, and then be delivered to the cogeneration system.

FIGS. 10 to 12 are diagrams schematically illustrating modified examples of the fourth embodiment.

As illustrated in FIG. 10, a hybrid power generation system, which is a modified example of the fourth embodiment, may include a single recuperator and a single waste heat recovery heat exchanger, and a power generation system using supercritical carbon dioxide and a cogeneration system share a combined heat exchanger 500.

In this case, the hybrid power generation system has the same configuration as the fourth embodiment, but it includes the single heat exchanger that uses waste heat gas as a heat source. Therefore, the combined heat exchanger 500 may be a single heat source that heats heating water.

As illustrated in FIG. 11, a hybrid power generation system may include two waste heat recovery heat exchangers and a combined heat exchanger 500 that serves as a condenser for cooling a working fluid in a power generation system using supercritical carbon dioxide. Heating water may be introduced into a second heat exchanger 330 (20 and 21) to be heated therein, and then be transferred to a cogeneration system (22 and 23).

As illustrated in FIG. 12, the heating water introduced into a combined heat exchanger 500 (20) may be heated through first and second heaters 510 and 530, without branching off in the combined heat exchanger 500, and then be delivered to a second heat exchanger 330 (21 and 22) to be reheated therein. The heating water heated by the second heat exchanger 330 is delivered to a cogeneration system (23 and 24).

FIG. 13 is a diagram schematically illustrating a hybrid power generation system according to a fifth embodiment of the present disclosure.

As illustrated in FIG. 13, the hybrid power generation system according to the fifth embodiment may be configured such that the working fluid heated through a single recuperator and waste heat recovery heat exchangers branches off and is supplied to two turbines, as in the fourth embodiment. In the hybrid power generation system, the waste heat recovery heat exchangers may be three in number, and a power generation system using supercritical carbon dioxide and a cogeneration system may share a combined heat exchanger 500. First and second heat exchangers 310 and 330 may be arranged in parallel to each other to use high-temperature or intermediate-temperature waste heat gas.

The working fluid having passed the pump 100 is primarily heated through a recuperator 210 (1), and is transferred to a second heat exchanger 330 (2). The working fluid, which is secondarily heated by the second heat exchanger 330 (3), branches off to high-pressure and low-pressure turbines 410 and 430 (4A and 4B). The working fluids having driven the high-pressure and low-pressure turbines 410 and 430 (5A and 5B) join at the front end of the recuperator 210 (6) to be transferred to the recuperator 210.

The working fluid transferred to the recuperator 210 (7) is cooled by losing heat to the working fluid having passed through the pump 100, and is then delivered to the combined heat exchanger 500 (8). The working fluid is recooled by heat exchange with heating water in the combined heat exchanger 500, and is then recirculated to the pump 100.

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water branches off again to be delivered to first and third heat exchanger 310 and 350 (22 and 23). The heating water, which is reheated by the first heat exchanger 310, and the heating water, which is reheated by the third heat exchanger 350, may be mixed and be transferred to the cogeneration system (24 and 25).

The hybrid power generation system may also include two waste heat recovery heat exchangers without a third heat exchanger. In this case, the hybrid power generation system has the same configuration as the fifth embodiment, but the heating water branched off in the combined heat exchanger 500 (21 and 22) is heated by the first heat exchanger 310 and is transferred to the cogeneration system (25).

FIG. 14 is a diagram schematically illustrating a hybrid power generation system according to a sixth embodiment of the present disclosure.

As illustrated in FIG. 14, the hybrid power generation system according to the sixth embodiment may be configured such that the working fluid heated through a single recuperator and waste heat recovery heat exchangers branches off and is supplied to two turbines, similar to the fourth embodiment. However, the hybrid power generation system may also include two recuperators and two waste heat recovery heat exchangers and a power generation system using supercritical carbon dioxide and a cogeneration system share a combined heat exchanger 500. First and second recuperators 210 and 230 are installed in parallel.

The flow of the working fluid having passed the pump 100 is similar to that in the fourth embodiment. However, the working fluids having passed through high-pressure and low-pressure turbines 410 and 430 (5A and 5B) are mixed (6), and then branch off from the front end of the first recuperator 210, so that a portion thereof is introduced into the first recuperator 210 (7) and another portion is introduced into the second recuperator 230. The working fluid delivered to the first recuperator 210 serves to heat the working fluid having passed through the pump 100, and the working fluid delivered to the second recuperator 230 serves to additionally heat heating water.

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). The heating water branched off in the combined heat exchanger 500 branches off to the respective second heat exchanger 330 and second recuperator 230 to be heated therein (22 and 23A). The heating water heated by the second heat exchanger 330 (23B and 24B) is mixed with the heating water heated by the second recuperator 230 (23A and 24A), and is then supplied to the cogeneration system.

The hybrid power generation system may also not include the second heat exchanger, and the heating water branched off in the combined heat exchanger 500 may also be additionally heated by the second recuperator 230 to be supplied to the cogeneration system.

FIG. 15 is a diagram schematically illustrating a hybrid power generation system according to a seventh embodiment of the present disclosure.

As illustrated in FIG. 15, the hybrid power generation system according to the seventh embodiment includes two recuperators and three waste heat recovery heat exchangers, and a power generation system using supercritical carbon dioxide and a cogeneration system share a combined heat exchanger 500. The two recuperators and the three heat exchangers are arranged in sequence.

The working fluid having passed through the pump 100 branches off to first and second recuperators 210 and 230 (2 and 10). The branched working fluids are delivered to respective first and second heat exchangers 310 and 330 to be heated therein (3 and 11). The working fluid heated by the first heat exchanger 310 is transferred to a high-pressure turbine 410 (4), and the working fluid heated by the second heat exchanger 330 is transferred to a low-pressure turbine 430 (12). The working fluid having passed through the high-pressure turbine 410 is transferred to the first recuperator 210. The working fluid having passed through the low-pressure turbine 430 is delivered to the rear end of the first recuperator 210 (13) to be mixed with the working fluid having passed through the first recuperator 210, and is then introduced into the second recuperator 230 (7).

The working fluid having passed through the second recuperator 230 is recooled by heat exchange with heating water in the combined heat exchanger 500 (8), and is recirculated to the pump (9).

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water may be delivered to a third heat exchanger 350 (23) to be reheated therein, and then be transferred to the cogeneration system (24 and 25).

The heating water, which is heated by the second heater 530 and is then discharged therefrom, and the heating water, which is reheated by the third heat exchanger 350, may also be first mixed and then delivered to the cogeneration system.

The waste heat recovery heat exchangers may be two instead of three in number. In this case, heating water in the cogeneration system may be heated by heat exchange with a working fluid in the combined heat exchanger 500, and then be supplied to the cogeneration system.

FIGS. 16 and 17 are diagrams schematically illustrating modified examples of the seventh embodiment.

As illustrated in FIG. 16, a hybrid power generation system has the same configuration as the seventh embodiment. However, a combined heat exchanger 500 may serve as a condenser that cools a working fluid in a power generation system using supercritical carbon dioxide, and the third heat exchanger 350 may serve to heat and supply heating water in a cogeneration system (20 to 23).

As illustrated in FIG. 17, a hybrid power generation system includes a third heat exchanger 350. After the heating water introduced into a combined heat exchanger 500 (20) is heated by first and second heaters 510 and 530, the heating water may be delivered to the third heat exchanger 350 (21 and 22) to be reheated therein. The heating water heated by the third heat exchanger 350 is delivered to a cogeneration system (23 and 24).

FIG. 18 is a diagram schematically illustrating a hybrid power generation system according to an eighth embodiment of the present disclosure.

As illustrated in FIG. 18, the hybrid power generation system according to the eighth embodiment may include two recuperators and four waste heat recovery heat exchangers, and a power generation system using supercritical carbon dioxide and a cogeneration system share a combined heat exchanger 500. The two recuperators and four heat exchangers are arranged in sequence. A first heat exchanger 310 is arranged to use high-temperature waste heat gas, second and third heat exchangers 330 and 350 are arranged to use intermediate-temperature waste heat gas, and a fourth heat exchanger 370 is arranged to use low-temperature waste heat gas.

The working fluid having passed through the pump 100 branches off to be delivered to the respective two recuperators. The working fluid heated by a first recuperator 210 (2) is reheated by the first heat exchanger 310 (3) to be delivered to the high-temperature pump 100 (4). The working fluid heated by a second recuperator 230 (10) is reheated by the third heat exchanger 350 (11) to be delivered to a low-pressure turbine 430 (23 and 12). The working fluid having passed through the low-pressure turbine 430 is transferred to the rear end of the first recuperator 210 (13).

The working fluid having passed through the high-temperature pump 100 is cooled in the first recuperator 210 to be mixed with the working fluid having passed through the low-temperature pump 100, and is then delivered to the second recuperator 230 (6 and 7). The working fluid cooled through the second recuperator 230 is delivered to the combined heat exchanger 500 (8) to be cooled therein, and is then recirculated to the pump 100 (9).

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the remainder of the branched heating water may be delivered to the fourth heat exchanger 370 (22). After another portion thereof may branch off (23) to the second heat exchanger 330 (23) to be reheated therein, they may be mixed and transferred to the cogeneration system (24 and 25).

FIG. 19 is a diagram schematically illustrating a modified example of the eighth embodiment.

As illustrated in FIG. 19, a hybrid power generation system does not include a fourth heat exchanger. The heating water branched off in a combined heat exchanger 500 may be delivered to a second heat exchanger 330 to be reheated therein, and then be transferred to a cogeneration system.

FIG. 20 is a diagram schematically illustrating a hybrid power generation system according to a ninth embodiment of the present invention.

As illustrated in FIG. 20, the hybrid power generation system according to the ninth embodiment of the present disclosure may include three recuperators and three waste heat recovery heat exchangers, and a power generation system using supercritical carbon dioxide and a cogeneration system may share a combined heat exchanger 500. In this case, the hybrid power generation system has the same configuration as the eighth embodiment, but the ninth embodiment differs from the eighth embodiment in that the working fluid having passed a low-pressure turbine 430 is transferred to the rear end of a first recuperator 210.

Accordingly, after heating water is primarily heated by the first heater 510 to branch off, a portion of the branched heating water is transferred to the cogeneration system, and another portion is reheated by a third heat exchanger 350 and a third recuperator 250 and is then provided to the cogeneration system.

The hybrid power generation system may also not include the third heat exchanger, and the heating water branched off in the combined heat exchanger 500 may be reheated by the third recuperator 250 and then be transferred to the cogeneration system.

FIG. 21 is a diagram schematically illustrating a hybrid power generation system according to a tenth embodiment of the present disclosure.

As illustrated in FIG. 21, the hybrid power generation system according to the tenth embodiment may include three recuperators and three waste heat recovery heat exchangers that are arranged in sequence, and a power generation system using supercritical carbon dioxide and a cogeneration system may share a combined heat exchanger 500. The hybrid power generation system includes a high-pressure turbine 410 for driving a generator and a low-pressure turbine 430 for driving a pump 100 (see the dotted line in FIG. 21), and the low-pressure turbine 430 is separately driven by the working fluid supplied from a first recuperator 210.

The working fluid having passed the pump 100 is primarily heated by a third recuperator 250 through which passes a working fluid having the lowest temperature (1). Then, the working fluid branches off to a second recuperator 250, through which passes an intermediate-temperature working fluid (2A), and a second heat exchanger 330, which uses intermediate-temperature waste heat gas (2B), to be heated therein.

The working fluids having passed through the second recuperator 230 and the second heat exchanger 330 are mixed and then branch off from the front end of a first heat exchanger 310. A portion of the branched working fluid is delivered to the first recuperator 210, through which passes a high-temperature working fluid, to be heated therein, and then drives the low-pressure turbine 430 (5B). After another portion of the branched working fluid is delivered to the first heat exchanger 310, which uses high-temperature waste heat gas, to be heated therein (4A), it drives the high-pressure turbine 410 and is then delivered to the first recuperator 210. The working fluid delivered to the first recuperator 210 after driving the high-temperature turbine 410, branches off from the front end of the first heat exchanger 310 to exchange heat with the working fluid delivered to the first recuperator 210. Thus, the working fluid is primarily cooled and then discharged. After the working fluid cooled in the first recuperator 210 drives the low-pressure turbine 430, it is again mixed with the working fluid introduced to the rear end of the first recuperator 210 (6B).

The mixed working fluid is introduced into the second recuperator 230 (7). The working fluid, which is secondarily cooled, by losing heat to the working fluid primarily heated in the third recuperator 250, through the pump 100 in the second recuperator 230, is delivered to the third recuperator 250 (8). The working fluid, which is thirdly cooled by heat exchange with the working fluid having passed through the pump 100 in the third recuperator 250, is transferred to the combined heat exchanger 500 (9) to be recooled by heat exchange with heating water, and is then recirculated to the pump 100 (10).

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water may be delivered to the third heat exchanger 350 (23) to be reheated therein, and then be transferred to the cogeneration system (24 and 25).

The heating water, which is heated by the second heater 530 and then discharged therefrom, and the heating water, which is reheated by the third heat exchanger 350, may also be first mixed and then delivered to the cogeneration system.

The hybrid power generation system may also not include the third heat exchanger and heating water is heated by the combined heat exchanger 500.

FIGS. 22 and 23 are diagrams schematically illustrating modified examples of the tenth embodiment.

As illustrated in FIG. 22, a hybrid power generation system is a modified example of the tenth embodiment, and includes a third heat exchanger 350. A combined heat exchanger 500 may serve as a condenser that cools a working fluid in a power generation system using supercritical carbon dioxide, and the third heat exchanger 350 may serve to heat and supply heating water in a cogeneration system (20 to 23).

As illustrated in FIG. 23, a hybrid power generation system includes a third heat exchanger 350. After the heating water introduced into a combined heat exchanger 500 (20) is heated by first and second heaters 510 and 530, the heating water may be delivered to the third heat exchanger 350 (21 and 22) to be reheated therein. The heating water heated by the third heat exchanger 350 is delivered to a cogeneration system (23 and 24).

FIG. 24 is a diagram schematically illustrating a hybrid power generation system according to an eleventh embodiment of the present disclosure.

As illustrated in FIG. 24, the hybrid power generation system according to the eleventh embodiment has the same configuration as the tenth embodiment, and may include four waste heat recovery heat exchangers that are arranged in sequence. In this case, second and third heat exchangers 330 and 350 may be arranged in parallel to each other to use intermediate-temperature waste heat gas.

In this case, the flow of a working fluid is similar to that in the tenth embodiment. However, the heating water branched off in a combined heat exchanger 500 may branch off to a fourth heat exchanger 370 (22) and the second heat exchanger 330 (23) to be reheated therein. The reheated heating water and the other reheated heating water are again mixed and delivered to the cogeneration system (24 and 25).

The hybrid power generation system may also not include the fourth heat exchanger, and the heating water branched off in the combined heat exchanger 500 may be reheated by the second heat exchanger 330 and then be transferred to the cogeneration system.

FIG. 25 is a diagram schematically illustrating a hybrid power generation system according to a twelfth embodiment of the present disclosure.

As illustrated in FIG. 25, the hybrid power generation system according to the twelfth embodiment has the same configuration as the tenth embodiment, and may further include a four recuperator 270 that is installed in parallel to the third recuperator 250.

In this case, the flow of a working fluid is similar to that in the tenth embodiment. However, the twelfth embodiment differs from the tenth embodiment in that a portion of the working fluid through the first and second recuperators 210 and 230 via the high-pressure turbine 410 branches off the fourth recuperator 270. The branched working fluids are introduced to the respective third and fourth recuperators 250 and 270. The working fluid introduced into the third recuperator 250 (8) is cooled by heat exchange with the working fluid having passed through the pump 100. The working fluid introduced into the fourth recuperator 270 (24) is cooled by heat exchange with heating water, and is then introduced to the rear end of the third recuperator 250. The working fluids having passed through the third and fourth recuperators 250 and 270 are mixed and delivered to the combined heat exchanger 500.

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water branches off to the third heat exchanger 350 (22 and 23B) and the fourth recuperator 270 (23A).

The heating water heated by the third heat exchanger 350 and the heating water heated by the fourth recuperator 270 are mixed at the rear end of the fourth recuperator 270 to be supplied to the cogeneration system.

FIG. 26 is a diagram schematically illustrating a hybrid power generation system according to a thirteenth embodiment of the present disclosure.

As illustrated in FIG. 26, the hybrid power generation system according to the thirteenth embodiment includes two recuperators, two heat exchangers, a single turbine, and two pumps, and a power generation system using supercritical carbon dioxide and a cogeneration system may share a combined heat exchanger. First and second recuperators 210 and 230 are arranged in sequence, and first and second heat exchangers 310 and 330 are arranged to respectively use high-temperature waste heat gas and low-temperature waste heat gas. The two pumps are driven by the turbine, and are a low-temperature-side pump, into which the working fluid cooled through the combined heat exchanger is introduced, and a high-temperature-side pump into which the working fluid branched off from the front end of the combined heat exchanger is introduced. The high-temperature-side pump has a relatively high temperature compared to the low-temperature-side pump. The working fluid having passed through a first pump 100 is transferred to the second recuperator 230, as a low-temperature-side recuperator in which it exchanges heat with a low-temperature working fluid (1), to be primarily heated therein, and is then transferred to the rear end of a second pump 110 (2). Next, the working fluid is mixed with the working fluid having passed through the second pump 110, and is introduced into the first recuperator 210, as a high-temperature-side recuperator in which it exchanges heat with a high-temperature working fluid (3), to be reheated therein. The working fluid heated by the first recuperator 210 is delivered to the first heat exchanger 310 (4) to be heated by high-temperature waste heat gas, and is transferred to a turbine 410 (5) to drive the turbine 410. A generator 450 and the first and second pumps 100 and 110 are driven by the driving of the turbine 410.

The working fluid having driven the turbine 410 is delivered to the first recuperator 210 (6) to be primarily cooled by losing heat to the working fluid having passed through the second pump 110, and is then transferred to the second recuperator 230 (7). The working fluid, which is secondarily cooled by losing heat to the working fluid having passed through the first pump 100 in the second recuperator 230, branches off from the rear end of the second recuperator 230, so that a portion thereof is delivered to the second pump 110 (9B) and another portion is delivered to the combined heat exchanger 500 (9). The working fluid, which is cooled by heat exchange with heating water in the combined heat exchanger 500, is recirculated to the first pump 100 (10).

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the branched heating water may be delivered to the second heat exchanger 330 (23) to be reheated therein, and then be transferred to the cogeneration system (24 and 25).

The heating water, which is heated by the second heater 530 and then discharged therefrom, and the heating water, which is reheated by the second heat exchanger 330, may also be first mixed with each other, and then be delivered to the cogeneration system.

The hybrid power generation system may also include a single waste heat recovery heat exchanger instead of the two waste heat recovery heat exchangers. In this case, heating water in the cogeneration system may be heated by heat exchange with a working fluid in the combined heat exchanger 500, and then be supplied to the cogeneration system.

FIGS. 27 and 28 are diagrams schematically illustrating modified examples of the thirteenth embodiment.

As illustrated in FIG. 27, a hybrid power generation system is a modified example of the thirteenth embodiment, and may have the same configuration as the thirteenth embodiment. However, a combined heat exchanger 500 may serve as a condenser that cools a working fluid in a power generation system using supercritical carbon dioxide, and a second heat exchanger 330 may serve to heat and supply heating water in a cogeneration system (20 to 23).

As illustrated in FIG. 28, a hybrid power generation system is a modified example of the thirteenth embodiment, and may have the same configuration as the thirteenth embodiment. After the heating water introduced into a combined heat exchanger 500 (20) is heated by first and second heaters 510 and 530, the heating water may be delivered to a second heat exchanger 330 (21 and 22) to be reheated therein. The heating water heated by the second heat exchanger 330 is delivered to a cogeneration system (23 and 24).

FIG. 29 is a diagram schematically illustrating a hybrid power generation system according to a fourteenth embodiment of the present disclosure.

As illustrated in FIG. 29, the hybrid power generation system according to the fourteenth embodiment has the same configuration as the thirteenth embodiment, and may include three waste heat recovery heat exchangers. In this case, first, second, and third heat exchangers 310, 330, and 350 may be arranged in sequence to use high-temperature waste heat gas, intermediate-temperature waste heat gas, and low-temperature waste heat gas, respectively.

The present embodiment is similar to the thirteenth embodiment in terms of the flow of a working fluid, but it differs from the thirteenth embodiment in terms of the flow of heating water having passed through a combined heat exchanger 500. That is, the heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). A portion of the heating water branched off in the combined heat exchanger 500 branches off to the third heat exchanger 350 (22) and the second heat exchanger 330 (23) to be reheated therein. The heating water heated by the second heat exchanger 330 and the heating water heated by the third heat exchanger 350 are mixed and supplied to the cogeneration system (25).

The hybrid power generation system may also not include the third heat exchanger, and the heating water branched off in the combined heat exchanger 500 may be entirely heated by the second heat exchanger 330 and then be supplied to the cogeneration system.

FIG. 30 is a diagram schematically illustrating a hybrid power generation system according to a fifteenth embodiment of the present disclosure.

As illustrated in FIG. 30, the hybrid power generation system according to the fifteenth embodiment has the same configuration as the thirteenth embodiment illustrated in FIG. 26, and may further include a third recuperator 250.

In this case, the present embodiment is similar to the thirteenth embodiment of FIG. 26 in terms of the flow of a working fluid, but it differs from the thirteenth embodiment in that the working fluid primarily cooled in the first recuperator 210 partially branches off from the front end of the second recuperator 230 to be supplied to the third recuperator 250.

The working fluid supplied to the third recuperator 250 is cooled once again by heat exchange with heating water, and is then mixed with the working fluid secondarily cooled through the second recuperator 230 from the front end of the combined heat exchanger 500 (8), to be supplied to the combined heat exchanger 500.

The heating water introduced into the combined heat exchanger 500 (20) is heated by heat received from the working fluid in the first heater 510 (20). The heating water heated by the first heater 510 branches off in the combined heat exchanger 500 (21) so that a portion thereof is heated by the second heater 530 and is then transferred to the cogeneration system (26). Another portion of the heating water branched off in the combined heat exchanger 500 branches off to the second heat exchanger 330 (23B) and the second recuperator 230 (23A) again to be reheated therein. The reheated heating water and the other reheated heating water are mixed and supplied to the cogeneration system (24 and 25).

The hybrid power generation system may also not include the second heat exchanger, and the heating water branched off in the combined heat exchanger 500 may also be additionally heated by the third recuperator 250 to be supplied to the cogeneration system.

As is apparent from the above description, a hybrid power generation system according to exemplary embodiments of the present disclosure may have an effect of enhancing efficiency of production of electricity and heating heat by integrated power generation using supercritical carbon dioxide ($CO_2$) and cogeneration. Moreover, the hybrid power generation system is effective in that it can enhance thermal efficiency of a cycle for power generation and can actively cope with a demand for electric power changed by season. Although the preferred embodiments have been disclosed for illustrative purposes, those skilled in the art will appreciate that various modifications, additions and substitutions are possible, without departing from the scope and spirit of the accompanying claims and their equivalents. Furthermore, the above advantages and features are provided in described embodiments, but shall not limit the application of such issued claims to processes and structures accomplishing any or all of the above advantages.

What is claimed is:

1. A hybrid power generation system including a power generation system that uses supercritical carbon dioxide as a working fluid to produce electrical energy and a cogeneration system that burns fuel to produce thermal energy and electrical energy, comprising:
    a pump operable to circulate the working fluid;
    at least one recuperator coupled to the pump and operable to heat the working fluid having passed through the pump;
    at least one first heat exchanger coupled to the at least one recuperator and operable to heat the working fluid having passed through the recuperator using an external heat source;
    a plurality of turbines coupled to the at least one recuperator and to the at least one first heat exchanger and operable to be driven by the working fluid heated in the at least one first heat exchanger; and
    a second heat exchanger operable to exchange heat between heating water of the cogeneration system and the working fluid to heat the heating water and cool the working fluid,
    a second heat exchanger shared by the power generation system using supercritical carbon dioxide and the cogeneration system and operable to exchange heat between heating water of the cogeneration system and the working fluid in order to heat the heating water and cool the working fluid,
    wherein the second heat exchanger is coupled to the pump to provide the working fluid having passed through the second heat exchanger to the pump, and
    wherein the at least one recuperator is operable to cool working fluid having passed through the turbines by heat exchange with the working fluid having passed through the pump and to supply the cooled working fluid to the second heat exchanger.

2. The hybrid power generation system according to claim 1,
    wherein the second heat exchanger is coupled to at least one of the at least one recuperator and the at least one first heat exchanger,
    wherein the second heat exchanger is coupled to the cogeneration system to supply the heating water to the cogeneration system, and
    wherein the second heat exchanger is coupled to the cogeneration system to receive the heating water from the cogeneration system.

3. The hybrid power generation system according to claim 2, wherein the at least one first heat exchanger is respectively coupled via a plurality of branches to the plurality of turbines to supply the working fluid to the plurality of turbines.

4. The hybrid power generation system according to claim 2, wherein:
    the at least one recuperator includes a plurality of recuperators and the at least one first heat exchanger includes a plurality of first heat exchangers,
    the pump is respectively coupled via a plurality of branches to the plurality of recuperators,
    the plurality of recuperators are respectively coupled to the plurality of first heat exchangers, and
    the plurality of first heat exchangers are respectively coupled to the plurality of turbines to supply the working fluid to the plurality of turbines.

5. The hybrid power generation system according to claim 2, wherein:
    the at least one recuperator includes a plurality of recuperators and the at least one first heat exchanger includes a plurality of first heat exchangers,
    the pump is respectively coupled via a plurality of branches to the plurality of recuperators,
    the plurality of recuperators are respectively coupled to the plurality of first heat exchangers, and
    at least one of the plurality of first heat exchangers is coupled to at least one of the plurality of recuperators to supply the working fluid to the at least one of the plurality of recuperators.

6. The hybrid power generation system according to claim 3, wherein the plurality of turbines are coupled to at least one of the at least one recuperator such that the working fluid respectively passing through the plurality of turbines is mixed and supplied to the at least one of the at least one recuperator.

7. The hybrid power generation system according to claim 4, wherein the plurality of turbines are coupled to at least one of the plurality of recuperators such that the working fluid respectively passing through the plurality of turbines is mixed and supplied to the at least one of the plurality of recuperators.

8. The hybrid power generation system according to claim 5, wherein the plurality of turbines are coupled to at least one of the plurality of recuperators such that the working fluid respectively passing through the plurality of turbines is mixed and supplied to the at least one of the plurality of recuperators.

9. The hybrid power generation system according to claim 1, wherein the at least one first heat exchanger includes a plurality of first heat exchangers, and the plurality of first heat exchangers are arranged in a sequence from an introduction portion of waste heat gas to a discharge portion of the waste heat gas.

10. The hybrid power generation system according to claim 9, wherein the at least one recuperator includes a plurality of recuperators arranged in a sequence from a recuperator using the working fluid of the introduction portion to a recuperator using the working fluid of the discharge portion, and is operable to cool the working fluid having passed through the plurality of turbines by heat exchange with the working fluid having passed through the pump.

11. A hybrid power generation system including a power generation system that uses supercritical carbon dioxide as a working fluid to produce electrical energy and a cogeneration system that burns fuel to produce thermal energy and electrical energy, comprising:
   a pump operable to circulate the working fluid;
   at least one recuperator coupled to the pump and operable to heat the working fluid having passed through the pump;
   at least one first heat exchanger coupled to the at least one recuperator and operable to heat the working fluid having passed through the recuperator using an external heat source;
   a single turbine coupled to the at least one recuperator and to the at least one first heat exchanger and operable to be driven by the working fluid heated in the at least one first heat exchanger; and
   a second heat exchanger operable to exchange heat between heating water of the cogeneration system and the working fluid to heat the heating water and cool the working fluid,
   a second heat exchanger shared by the power generation system using supercritical carbon dioxide and the cogeneration system and operable to exchange heat between heating water of the cogeneration system and the working fluid in order to heat the heating water and cool the working fluid,
   wherein the second heat exchanger is coupled to the pump to provide the working fluid having passed through the second heat exchanger to the pump, and
   wherein the at least one recuperator is operable to cool working fluid having passed through the turbines by heat exchange with the working fluid having passed through the pump and to supply the cooled working fluid to the second heat exchanger.

12. The hybrid power generation system according to claim 11, wherein at least one of the at least one recuperator and the at least one first heat exchanger is further operable to heat the heating water and is coupled to the cogeneration system to supply the heated water to the cogeneration system.

13. The hybrid power generation system according to claim 12, wherein the second heat exchanger is coupled to at least one of the at least one recuperator and the at least one heat exchanger to supply the heating water to the at least one of the at least one recuperator and the at least one first heat exchanger.

14. The hybrid power generation system according to claim 13, wherein the recuperator is coupled to the at least one first heat exchanger to supply the heating fluid to the at least one heat exchanger, the at least one heat exchanger is coupled to the single turbine to supply the heating fluid to the turbine, and the single turbine is coupled to the at least one recuperator to supply the heating fluid to the at least one recuperator.

15. The hybrid power generation system according to claim 13, wherein:
   the pump includes a plurality of pumps,
   the at least one recuperator includes a plurality of recuperators,
   the at least one first heat exchanger includes a plurality of first heat exchangers,
   the second heat exchanger is coupled to a high temperature side pump of the plurality of pumps via a first branch and to a low temperature side pump of the plurality of pumps via a second branch,
   the low temperature side pump is coupled to a low temperature side recuperator of the plurality of recuperators, and
   the low temperature side recuperator and the high temperature side pump are respectively coupled to a high temperature side recuperator of the plurality of recuperators to supply the high temperature side recuperator with mixed working fluid from the low temperature side recuperator and the high temperature side pump.

16. The hybrid power generation system according to claim 15, wherein the high temperature side recuperator is coupled to one of the plurality of first heat exchangers to supply the working fluid to the one of the plurality of first heat exchangers, and the one of the plurality of first heat exchangers is coupled to the single turbine to supply the working fluid to the single turbine.

17. The hybrid power generation system according to claim 16, wherein the single turbine is coupled to one of the plurality of recuperators to supply the working fluid to the one of the plurality of recuperators.

18. The hybrid power generation system according to claim 11, wherein the at least one first heat exchanger includes a plurality of first heat exchangers arranged in a sequence from an introduction portion of waste heat gas to a discharge portion of the waste heat gas.

19. The hybrid power generation system according to claim 18, wherein the at least one recuperator includes a plurality of recuperators arranged in a sequence from a recuperator using the working fluid of the introduction portion to a recuperator using the working fluid of the discharge portion, and is operable to cool the working fluid having passed through the single turbine by heat exchange with the working fluid having passed through the pump.

* * * * *